United States Patent
Reese et al.

(10) Patent No.: US 10,823,546 B1
(45) Date of Patent: Nov. 3, 2020

(54) REINFORCEMENTS FOR INDUCING ANISOTROPIC BENDING IN COMPLIANT ANGULAR DISPLACEMENT SENSORS

(71) Applicant: Bend Labs, Inc., Salt Lake City, UT (US)

(72) Inventors: Shawn P. Reese, Salt Lake City, UT (US); Jared K. Jonas, Seattle, WA (US); Matt W. Ball, Woods Cross, UT (US); Colton Allen Ottley, Farmington, UT (US)

(73) Assignee: BEND LABS, INC., Salt Lake City, UT (US)

(*) Notice: Subject to any disclaimer, the term of this patent is extended or adjusted under 35 U.S.C. 154(b) by 111 days.

(21) Appl. No.: 15/943,295

(22) Filed: Apr. 2, 2018

Related U.S. Application Data

(60) Provisional application No. 62/480,975, filed on Apr. 3, 2017.

(51) Int. Cl.
  *G01R 27/26* (2006.01)
  *G01B 7/30* (2006.01)

(52) U.S. Cl.
  CPC ..................................... *G01B 7/30* (2013.01)

(58) Field of Classification Search
  CPC . G01B 7/30; G01B 7/003; G01B 7/14; G01D 5/145; G01D 5/147; G01D 5/202; G01D 5/206; G01D 5/225; G01D 5/2208; G01D 5/12; G01D 5/14; G01D 5/16; G01D 5/2457; G01D 5/2013; G01D 5/2046
  See application file for complete search history.

(56) References Cited

U.S. PATENT DOCUMENTS

| | | | | |
|---|---|---|---|---|
| 5,610,528 | A * | 3/1997 | Neely | A61B 5/1071 324/660 |
| 6,127,672 | A * | 10/2000 | Danisch | G01B 11/18 250/227.14 |
| 9,993,993 | B2 * | 6/2018 | Simmons | B32B 5/26 |
| 2002/0088931 | A1 * | 7/2002 | Danisch | G01D 5/268 250/227.14 |
| 2010/0286950 | A1 * | 11/2010 | Heijkants | A61B 5/1071 702/151 |
| 2011/0307214 | A1 * | 12/2011 | Saitou | G01B 7/18 702/155 |
| 2016/0305759 | A1 * | 10/2016 | Reese | G01B 7/22 |

* cited by examiner

*Primary Examiner* — Thang X Le
(74) *Attorney, Agent, or Firm* — Parsons Behle & Latimer

(57) ABSTRACT

An apparatus includes a strand of compliant material with a center axis. The apparatus further includes a multi-region angular displacement sensor connected to the strand. The multi-region angular displacement sensor includes a first angular displacement unit in a first sense region of the stand. The first angular displacement unit is used to determine a first angular displacement in response to deformation of the first angular displacement unit. The multi-region angular displacement sensor also includes a second angular displacement unit disposed in a second sense region of the strand. The second angular displacement unit is used to determine a second angular displacement in response to deformation of the second angular displacement unit. The multi-region angular displacement sensor also includes a reinforcement structure that restricts movement of the first and second angular displacement unit with respect to the center axis.

20 Claims, 28 Drawing Sheets

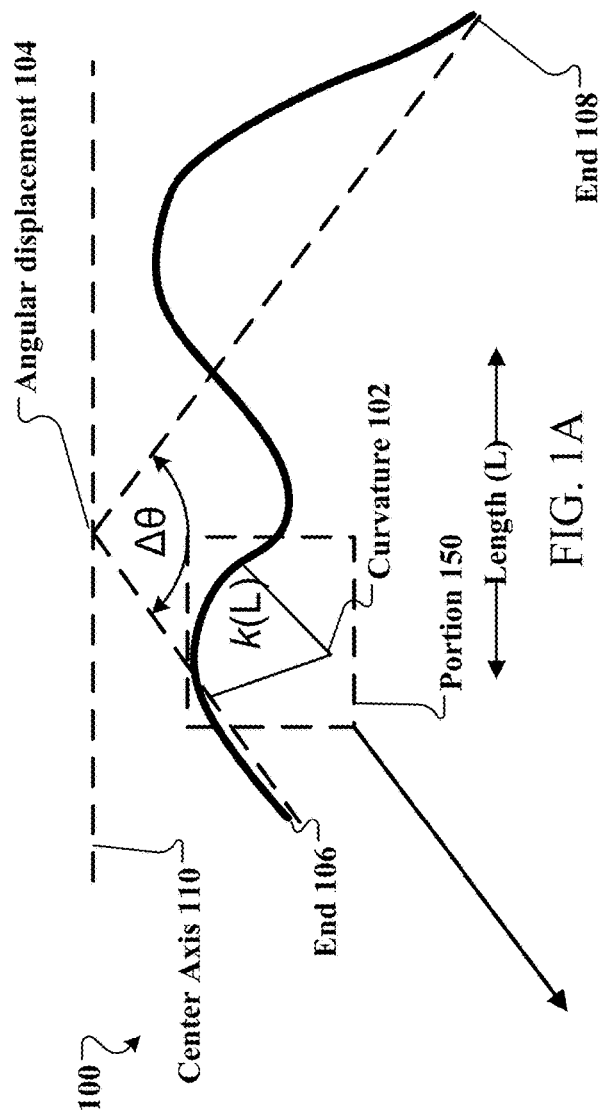
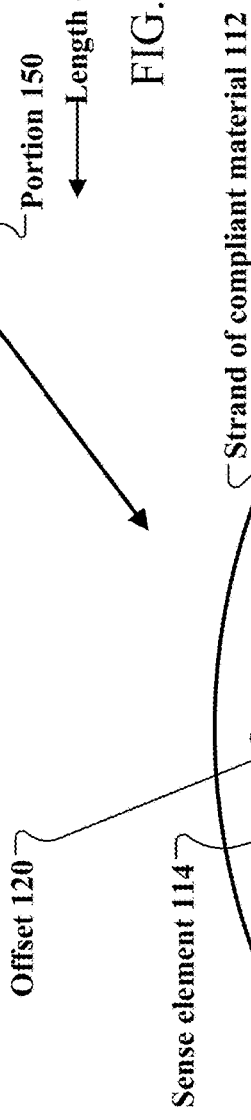
FIG. 1A
FIG. 1B

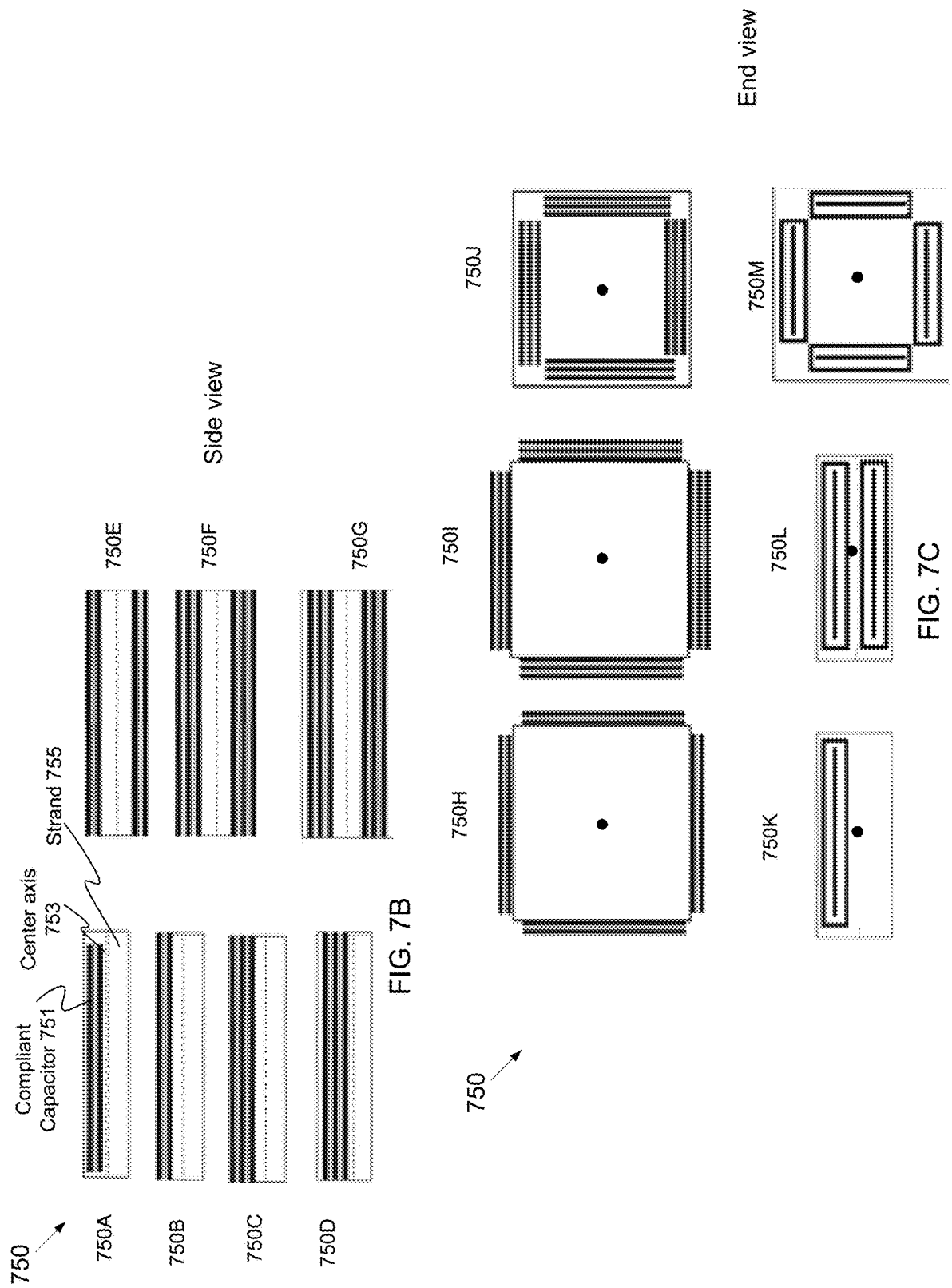

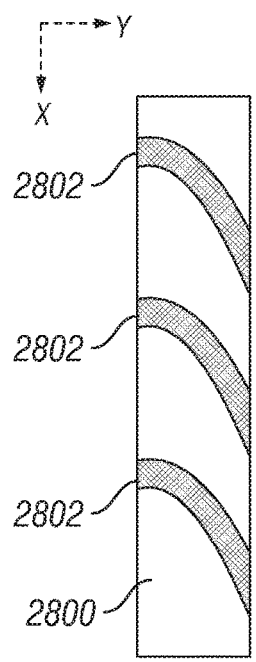 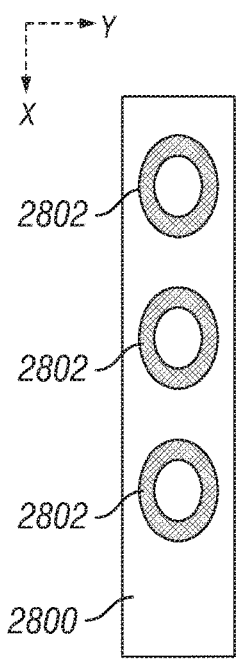 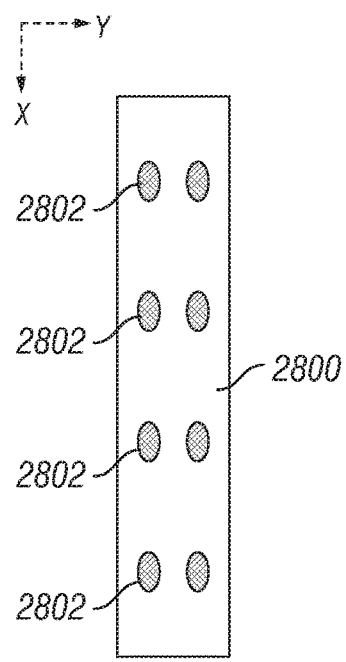
*FIG. 28A*  *FIG. 28B*  *FIG. 28C*

US 10,823,546 B1

REINFORCEMENTS FOR INDUCING ANISOTROPIC BENDING IN COMPLIANT ANGULAR DISPLACEMENT SENSORS

RELATED APPLICATIONS

This application claims the benefit of U.S. Provisional Application No. 62/480,975, filed Apr. 3, 2017, the entire contents are hereby incorporated by reference.

BACKGROUND

Sensors for detecting, measuring, and monitoring environmental events or changes are ubiquitous in the field of engineering. Sensors may provide a corresponding output responsive to detecting, measuring, and monitoring environmental events or changes. A variety of sensors exist and include temperature sensors, pressure sensors, ultrasonic sensors, strain sensors, light sensors, flex and bend sensors, angular displacement sensors, among others. Sensors may use different types of sense elements, such as capacitive sense elements, resistive sense elements, photonic sense elements, or others types of sense elements, to sense the environmental changes.

BRIEF SUMMARY OF THE INVENTION

Disclosed embodiments include apparatus including a strand of compliant material with a center axis oriented along a length of the strand and oriented perpendicular to a width of the strand when the strand is in a linear and non-bent position, and a multi-region angular displacement sensor connected to the strand, the multi-region angular displacement sensor having a first angular displacement unit disposed in a first sense region of the strand, wherein the first angular displacement unit is offset from the center axis of the strand and extends along a first line offset from a first part of the center axis, wherein the first angular displacement unit comprises a first end defining a first vector and a second end defining a second vector, wherein a first angular displacement between the first vector and the second vector within a first plane extending along the first part of the center axis and orthogonal to a width of the first angular displacement unit is to be determined responsive to deformation of the first angular displacement unit, and a second angular displacement unit disposed in a second sense region of the strand, wherein the second angular displacement unit is offset from the center axis of the strand and extends along a second line offset from a second part of the center axis, wherein the second angular displacement unit comprises a third end defining a third vector and a fourth end defining a fourth vector, wherein a second angular displacement between the third vector and the fourth vector within a second plane extending along the second part of the center axis and orthogonal to a width of the second angular displacement unit is to be determined in response to deformation of the second angular displacement unit, and a reinforcement structure associated with the first angular displacement unit and the second angular displacement unit, wherein the reinforcement structure is a material that is stiffer than the strand of compliant material and restricts movement the first angular displacement unit and the second angular displacement unit with respect to the center axis. Other embodiments are also disclosed.

BRIEF DESCRIPTION OF THE DRAWINGS

The present disclosure is illustrated by way of example, and not by way of limitation, in the figures of the accompanying drawings.

FIG. 1A is an illustration of a simplified angular displacement unit, in accordance with some embodiments.

FIG. 1B is an illustration of a portion of the simplified angular displacement unit of FIG. 1A, in accordance with some embodiments.

FIGS. 7B and 7C illustrate cross sections of angular displacement units with different electrode configurations and electrode placements, according to some embodiments.

FIGS. 28A-C illustrate embodiments of a compliant capacitive angular displacement sensor with reinforcement structures of different shapes.

DETAILED DESCRIPTION

Figure 2:
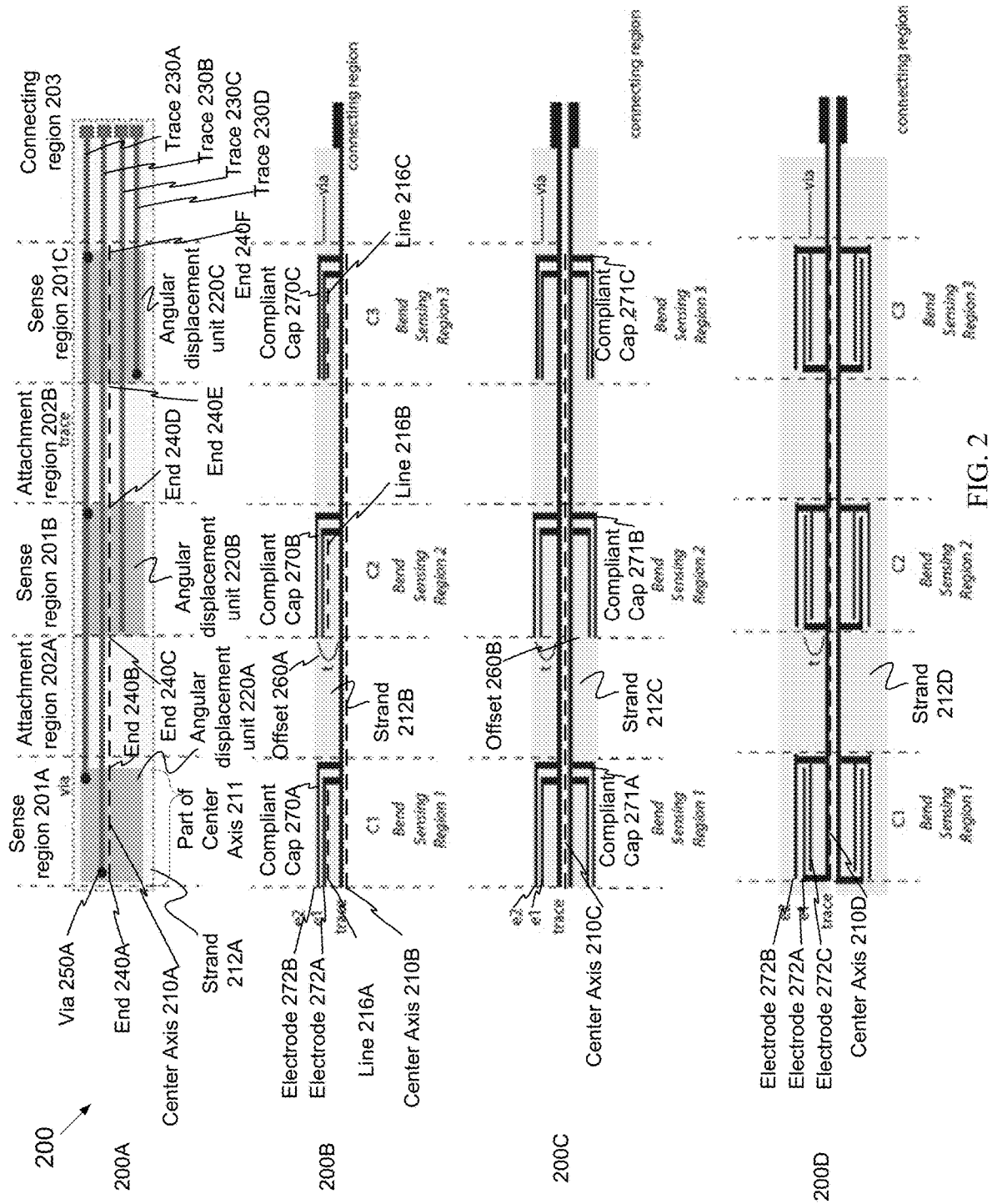
FIG. 2 illustrates different configurations of a multi-region angular displacement sensor, in accordance with some embodiments.

Sensor systems for sensing position and movement may sense movement about a point with one, two, or three rotational degrees of freedom. Each rotational degree of freedom may be described by an angular displacement occurring within a plane that is orthogonal to the planes that define the other two rotational degrees of freedom. A sensor of a sensor system that measures angular displacement may deform at multiple points along the sensor and deform in any direction in three-dimensional space (i.e., in three rotational degrees of freedom). A sensor of a sensor system that measures angular displacement may repeatedly experience large angular displacement, such as an angular displacement of 90 degrees or greater. Some sensor systems may not have the elasticity to withstand such deformation. Other sensor systems may incur temporary or permanent deformation or damage if repeatedly subjected to large angular displacement. Other systems may have poor repeatability and accuracy. Sensor systems that measure angular displacement of different regions, such as different joints of the human body, experience the above challenges as well as others. For example, the human body includes a multitude of joints that move in different directions and along different and multiple axes. Measuring the movement of the different joins may provide other challenges. Elasticity of the sensors, interconnection of different sensors, placement of the sensors, independent measurement of angular displacement of the different regions, as well as other factors contribute to the challenge of a sensor system that measures angular displacement of different regions.

Embodiments of the present disclosure address the deficiencies described above and other deficiencies by providing a multi-region angular displacement sensor that includes multiple sense regions (also referred to as "sensing regions") that are spatially distinct. A sense region may include an angular displacement unit used to determine an angular displacement associated with the particular sense region. The angular displacement of a sense region may be determined independent of an angular displacement of another sense region of the multi-region angular displacement sensor. The angular displacement unit is stretchable between a first end and a second end and bendable along a length of the first angular displacement unit and the length of the multi-region angular displacement sensor in any direction in three-dimensional space. The angular displacement unit may also be associated with reinforcement regions that restrict movement of the angular displacement unit.

In one embodiment, the multi-region angular displacement sensor may be connected to a strand of compliant material (also referred to as "strand", "body", "elongated body") with a center axis orientated along a length of the strand and orientated perpendicular to a width of the strand when the strand is in a linear and non-bent position. The strand may be stretchable along the length of the strand and may be bendable along the length of the strand in any direction in three-dimensional space. The strand may be of an elastomeric material such as rubber. The strand may include multiple sense regions. A sense region may be an area defined by an angular displacement unit or other sense unit within a sense region of the strand. An angular displacement unit may include one or more compliant capacitors offset from the center axis of the strand, where the compliant capacitors are connected to (e.g., connected on top of, partially embedded in, or fully embedded in) the strand (e.g., compliant matrix). The compliant capacitors may extend along a line offset from part of the center axis, where the part of the center axis may be the angular displacement axis for the respective angular displacement unit. A first sense region may include a first angular displacement unit. The first angular displacement unit includes a first end defining a first vector and a second end defining a second vector. An angular displacement between the first vector and the second vector within a first plane extending along the first part of the center axis and orthogonal to the width of the first angular displacement unit may be determined responsive to deformation of the first angular displacement unit. A deformation may refer to any change in size or shape of an object, such as an angular displacement unit, due to an applied force from another object. The deformation energy may be transferred through work rather than by heat, chemical reaction, moisture, etc. In one example, the deformation may be from a tensile force (e.g., pulling), a compressive force (e.g., pushing), shear force, bending force, and/or torsional force (e.g., twisting). The first angular displacement unit may stretchable between the first end and the second end and bendable along a length of the first angular displacement unit in any direction in a three-dimensional space. Other sense regions of the multiple sense regions may include an angular displacement unit similar to the first angular displacement unit described above. Each angular displacement unit of the respective sense region may measure angular displacement of the respective sense region independent from other sense region. In one example, the multi-region angular displacement sensor may be used to measure the angular displacement of joints of a human body to determine movement. For example, the multi-region angular displacement sensor may be used to measure the angular displacement of joints of a human hand to determine the movement of the human hand.

FIG. 1A is an illustration of a simplified angular displacement unit, in accordance with some embodiments. Angular displacement unit 100 is illustrated with end 106 and end 108. The curvature 102,k(L) varies along the length (L) of the angular displacement unit 100 (e.g., where length (L) extends from end 106 to the other end 108). The angular displacement unit 100 is stretchable between end 106 and end 108 and bendable along a length (L) of the angular displacement unit 100 in any direction in a three-dimensional space. For example, angular displacement unit 100 may behave similarly to a rubber band. Angular displacement unit 100 may stretch and bend along multiple points along the length. At any point along the length, angular displacement unit 100 may bend at 90 degrees or greater in any direction in three-dimensional space. For example, angular displacement unit 100 may be folded onto itself multiple times and/or twisted.

Angular displacement 104 (also referred to as bend) may be a change in angle (i.e., $\Delta(\Theta)$) relative to an axis, such as center axis 110, or a center plane (i.e., a plane that intersects the center axis and is coplanar to the width of the angular displacement unit) and about a plane intersecting the axis and orthogonal to the width of the angular displacement unit, such as angular displacement unit 100. It should be noted that center axis 110, as illustrated in FIG. 1A, shows the center axis 110 when angular displacement unit 100 is in a linear and non-bent position. Center axis 110 of angular displacement unit 100 will curve or bend as angular displacement unit 100 curves and bends, as illustrated in FIG. 1B. Angular displacement 104 may be determined by integrating the curvature 102,k(L) along the length (L) of the angular displacement unit 100 to generate a value indicative of a change in the angular displacement 104 (i.e., $\Delta(\Theta)$). Extraneous bending of the angular displacement unit 100 may not impact the measurement of angular displacement 104 of the ends 106 and 108 (also referred to as sensor ends), as the extraneous positive curvature may cancel out the extraneous negative curvature along the length (L) of angular displacement unit 100. Center axis 110 may an arbitrary axis that is defined relative to the one or more sense elements (e.g., sense element 114 of FIG. 1B) (also referred to as "sensing elements") of angular displacement unit 100. For example, when angular displacement unit 100 is in a linear and non-bent position, angular displacement unit 100 aligns with center axis 110. Center axis 110 may be positioned at some location relative to the sense elements of angular displacement unit 100, as illustrated in FIG. 1B. End 106 and end 108 may define two respective vectors of angular displacement unit 100. A vector may be a line from a first point where the center axis intersects a first plane at the end of the angular displacement unit 100, where the first plane is perpendicular to the center axis, and through a second point an infinitesimal distance away from the end of angular displacement unit 100 that is contained within a second plane, where the second plane is orthogonal to the first plane and runs through the center axis by bisecting a sense element of angular displacement unit 100 sensor along the length of the sense element. Vectors may be further described at least with respect to FIG. 6.

FIG. 1B is an illustration of a portion 150 of the simplified angular displacement unit of FIG. 1A, in accordance with some embodiments. Angular displacement unit 100 may include one or more sense elements, such as sense element 114. In another embodiment, angular displacement unit 100 may include another sense element (not shown) offset from center axis 110 in a −Z direction and orientated parallel to sense element 114. In one example, sense element 114 is compliant capacitor, such as an elastomeric capacitor. In one example, sense element 114 may consist of three layers of elastomer. Two layers may each be an electrode layer made from conductive filler such as, a conductive carbon nanotube or elastomer composite. It should be appreciated that other electrode configurations may also be implemented, as further described with respect to at least FIG. 7B. The conductive filler may maintain conductivity at small and large deformations responsive to small and large strains. Between the two electrode layers may be a non-conducting dielectric layer. The capacitance of the compliant capacitor may be approximated as a parallel plate capacitor using the following equation:

$$c = \frac{k\varepsilon_0 A}{D}$$

C is capacitance, k is relative permittivity, $\varepsilon_0$ is the permittivity of free space, A is the area of the electrodes, and D is the thickness of the dielectric.

Strain and stretch describe how things elastically deform. Strain ($\varepsilon$) may be described as $$\frac{l - L_0}{L_0},$$

where l is the total length of deformed material and $L_0$ is the change in length caused by the deformation. Stretch ($\lambda$) may be described as $$\frac{l}{L_0}.$$

The term strain may be used to describe small deformation (e.g., metal rod under tension), while stretch may be used to describe a larger deformation (e.g., rubber band under tension). Strain may be a three-dimensional measure ($\varepsilon_x$, $\varepsilon_y$, $\varepsilon_z$) or a one-dimensional value, where strain is measured along an axis of tensile strain. In tension, strain is positive. In compression, strain is negative. Stretch and strain may be used synonymously herein, unless otherwise described. When in tensile stretch ($\lambda$) and assuming Poisson's ratio of 0.5 (as elastomers a relatively incompressible), the following capacitance-strain relationship may be described in the following equation:

$$c(\lambda) = c_0 \lambda$$

$c_0$ is the capacitance in the unstrained state, $\lambda$ is stretch (or strain) as defined above, and $c(\lambda)$ is the capacitance under strain. It should be noted that $c(\lambda)$ is linear function of strain and is valid for both small and large strains (i.e., for both strain and stretch as defined above).

In one embodiment, angular displacement unit 100 may include sense element 114 embedded within strand 112 of compliant material, such as an elastomeric matrix, such that the sense element 114 is offset 120 a distance Z from center axis 110 of strand 112. It should be appreciated that in other embodiments, sense element 114 may be partially embedded in the strand 112 or connected to strand 112 (e.g., connected to an outer surface of strand 112). Offset 120 may be a distance Z from the center axis 110. When the angular displacement unit 100 is bent, a curvature 102 (i.e., k (L)) may be induced in the sense element 114. The curvature may result in a positive tensile strain, $\varepsilon_t$, in sense element 114 on the outside (located a distance +Z form the center axis 110) and in a negative compressive strain, $\varepsilon_c$, on the sense element (not shown) on the inside (located a distance −Z from the center axis 110). For small values of Z relative to the curvature, the curvature may be linearly related to the strain in the sense element 114 and estimated by the equation (units are 1/distance):

$$k = \frac{\varepsilon_t - \varepsilon_c}{2z}$$

It should be noted that the above equation may be used when an angular displacement unit includes two coplanar compliant capacitor offset and reflected about a center axis or center plane. For an angular displacement unit with one compliant capacitor offset and reflected about a center axis or center plane the negative compressive strain, $\varepsilon_c$, may be removed from the equation.

Although one sense element 114 is illustrated in FIG. 1B, two or more sense elements may be used in an angular displacement unit 100. In one example, using two sense elements in parallel and reflected about center axis 110 may reduce common mode noise and/or increase the signal to noise ratio. When two or more sense elements orientated parallel are used in an angular displacement unit 100 a differential capacitance measurement may be made. For example, the difference between two separate capacitance measurements may be a differential capacitance measurement. In another example, the sense element 114 may share a ground plane (e.g., relative ground potential) with another sense element, and the difference between two separate capacitance measurements may be a differential capacitance measurement. It should be noted that by connecting one or more additional sense elements in strand 112 perpendicular to sense element 114, angular displacement unit 100 may measure angular displacement in two orthogonal planes and any point within the two orthogonal planes. It should be appreciated that additional sense elements in the strand 112 may be in a position other than perpendicular to sense element 114 so that angular displacement unit 100 may measure the angular displacement about other planes. It should also be appreciated that connecting a one or more sense elements in a helical fashion may allow for the measuring of torsion about the center axis 110.

Sense element 114 may be a compliant capacitor including at least two electrodes (e.g., compliant electrodes) with a compliant dielectric disposed between the two electrodes. The electrodes may also define a thickness or depth (e.g., Z direction) such that the two electrodes of compliant capacitors may include a similar thickness or depth in the range of about 10-500 microns. The compliant dielectric disposed between the electrodes may define a thickness or depth of about 10 to 200 microns. In addition, the strand 112 of compliant material layer 36 positioned may include a depth in the range of about 0.5-8 mm or greater.

The electrodes of the compliant capacitor may be a partially conductive material (and an elastomer based material) so as to conduct a charge or current. The compliant dielectric between the electrodes may be non-conductive or slightly conductive (e.g., less conductive than the electrodes) and formed of a similar material as the strand 112. The electrodes may be formed along as layers of an elastomer based material with conductive filler, as conductive or metal nano particles. The nano particles may include carbon nanotubes, carbon nanofibers, nickel nanostrands, silver nanowires, carbon black, graphite powder, graphene nano platelets, and/or other nano particles. In another embodiment, the conductive filler may be a micro particle of the same or similar material as the nano particle. In one embodiment, the electrode of the compliant strain sensing element may be manufactured using ion embodiment of the conductive filler to embed the nano particles, for example, into an elastomer.

In one embodiment, a minimum amount of conductive filler particles is used, as excess filler concentrations may alter the elastic behavior of the elastomer. Excessive conductive filler particles may limit the ability of the angular displacement unit 100 to effectively bend and result in an electrical circuit break through bending the angular displacement unit 100. Furthermore, intrinsically conductive elastomers or other compliant materials may be used, such as ionogels and elastomer or polymers with free charge carriers or similar.

The strand 112 (e.g., elastomeric matrix) may be a thermoset or thermoplastic elastomer. Further, the strand 112 may be a dielectric material and non-conductive. Strand 112 may include structural characteristics of high elongation at failure greater than 20% and preferably greater than 500%, a low durometer preferably at a 60 Shore A scale, but may be anywhere in the range of 1-90 on the Shore A scale. In addition, strand 112 may include a low compression set of 1-30%. In one embodiment, a thermoset elastomer may include tin or platinum cured silicone elastomers and/or polyurethane elastomer components or any other suitable elastomer material. In another embodiment, a thermoplastic elastomer may include components of styrene-ethylene/butylene-styrene (SEBS), styrene-block-butadiene-block-styrene (SBS), and/or polyurethanes or any other suitable thermoplastic elastomer.

FIG. 2 illustrates different configurations of a multi-region angular displacement sensor, in accordance with some embodiments. Multi-region angular displacement sensor 200 includes several views of multi-region angular displacement sensors with different configurations. It should be noted that features that are described with respect to multi-region angular displacement sensor 200 apply to multi-region angular displacement sensor 200A-200D, unless otherwise described. Multi-region angular displacement sensor 200 illustrates a top view of multi-region angular displacement sensor 200A, a cross section of a side view of multi-region angular displacement sensor 200B, another cross section of a side view of another multi-region angular displacement sensor 200C, and a cross section of a side view of still another multi-region angular displacement sensor 200D.

Multi-region angular displacement sensor 200 (or strand 212A) has multiple sense regions 201 including sense region 201A, sense region 201B, and sense region 201C. Although three sense regions are described, two or more sense regions may be included in multi-region angular displacement sensor 200. Sense region 201A includes angular displacement unit 220A, sense region 201B includes angular displacement unit 220B, and sense region 201C includes angular displacement unit 220C. It should be appreciated that all sense regions 201 are illustrated with angular displacement unit 220, some of sense regions 201 may contain other sense units, such as strain unit, or pressure unit, or torsional unit, for example.

Angular displacement units 220 include two ends, where each end defines a vector of angular displacement. Angular displacement unit 220A includes end 240A and 240B, angular displacement unit 220B includes end 240C and 240D, and angular displacement unit 220C includes end 240E and 240F. The vectors associated with ends 240 are defined with respect to the center axis 210 (also referred to as angular displacement axis). Center axis 210 is illustrated as common to all the angular displacement units 220 of multi-region angular displacement sensor 200. It should be appreciated a center axis 210 may be distinct for one or more of angular displacement units 220 or distinct for one or more compliant capacitors (e.g., compliant capacitor 270) of an angular displacement unit 220. For example, end 240A and end 240B of angular displacement unit 220A extend between part 211 of center axis 210A. The respective part 211 of the center axis 210A corresponding to the angular displacement unit 220A is the angular displacement axis for angular displacement unit 220A. The respective part of the center axis 210A corresponding to the angular displacement unit 220B is the angular displacement axis for angular displacement unit 220B. The respective part of the center axis 210A corresponding to the angular displacement unit 220C is the angular displacement axis for angular displacement unit 220C. It should be appreciated that each angular displacement unit 220 may have a respective center axis (e.g., part of center axis) independent from other center axes of other angular displacement units. For example, angular displacement unit 220B may be rotated 90 degrees so that end 240C and end 240D are orientated vertically. The center axis associated with rotated angular displacement unit 220B may be at a 90 degree angle to center axis 210A.

Multi-region angular displacement sensor 200 may be connected to a strand 212 (e.g., strand 212A, 212B, 212C, and 212D) of compliant material, such as an elastomeric matrix. In one embodiment, multi-region angular displacement sensor 200 is embedded in strand 212. In another embodiment, multi-region angular displacement sensor 200 is partially embedded in strand 212. In still another embodiment, multi-region angular displacement sensor 200 is connected on an outer surface of strand 212. Sense regions 201 may be connected by respective attachment regions 202. For example, sense region 201A and sense region 201B are physically connected to attachment region 202A, sense region 201B and sense region 201C are physically connected to attachment region 202B. Attachment region may be of any material. In one embodiment, attachment region 202 may be stretchable and made of a compliant material, such as an elastomeric matrix. In another embodiment, attachment region may be made of a material that is inelastic or less elastic than strand 212A. For purposes of illustration, multi-region angular displacement sensor 200 is shown embedded in a single strand 212A of compliant material. However, it should be appreciated that other configurations may be implemented. For example, one or more angular displacement units 220 may be implemented on independent strands connected by attachment regions 202. Attachment region 202 may be any length starting from 0 centimeters. In some embodiments, attachment region 202 is not implemented.

Each angular displacement unit 220 is connected to one or more traces 230. Angular displacement unit 220A is connected to trace 230A and 230B. Angular displacement unit 220B is connected to trace 230A and 230C. Angular displacement unit 220C is connected to trace 230A and 230D. Traces 230 may be a compliant conductive material able to deform similarly to strand 212. In one embodiment, the traces 230 are made from an elastomer, similar to compliant capacitors 270. In another embodiment, traces 230 made from an elastomer but of a different composition than compliant capacitors 270. For example, traces 230 may use a different conductive filler and/or a different amount of conductive filler than compliant capacitors 270. Traces 230 may be stretchable along the length of trace 230 while maintaining connectivity and conductivity. Traces 230 may be bendable in any direction in a three-dimensional space and maintain connectivity and conductivity. Traces 230 may be on the same plane as the electrodes of angular displacement unit 220, as illustrated by trace 230C connected to angular displacement unit 220B. Traces 230 may be on a different plane than the electrodes of angular displacement unit 220, as illustrated by trace 230B connected to angular displacement unit 220A through via 250A. Additional vias are illustrated by black dots associated with multi-region angular displacement sensor 200A (e.g., via 250A) and vertical lines as illustrated with respect to multi-region angular displacement sensor 200B-200C. Vias, such as via 250A, may be made from numerous materials, such as a compliant conductive material.

Multi-region angular displacement sensor 200 may also include connecting region 203. Connecting region 203 may be an electrical connecting area or terminal area for one or more traces. Connecting region may be made of any material. In one embodiment, connecting region 203 is part of strand 212. In another embodiment, connecting region may be a flexible or hard circuit board. Connecting region 203 may connect multi-region angular displacement sensor 200 to other circuits, power, and/or other multi-region angular displacement sensors. Connecting region 203 may include electrode pads to facilitate an electrical connection.

Multi-region angular displacement sensor 200B illustrates a cross section of a side view of a multi-region angular displacement sensor 200. Multi-region angular displacement sensor 200B includes angular displacement units 220 that each include a compliant capacitor 270 offset 260A a distance "t" away from center axis 210B and along a line 216 (e.g., line 216A, line 216B, and line 216V) offset from center axis 210B. Angular displacement unit 220A of multi-region angular displacement sensor 200B includes compliant capacitor 270A. Angular displacement unit 220B of multi-region angular displacement sensor 200B includes compliant capacitor 270B. Angular displacement unit 220C of multi-region angular displacement sensor 200B includes compliant capacitor 270C. Compliant capacitors 270 include two electrodes. For example, compliant capacitor 270A includes electrode 272A and electrode 272B with a dielectric interposed between. It should be appreciated that although angular displacement units 220 (and the compliant capacitor 270 of the angular displacement units 220) are illustrated as rectangles, angular displacement unit 220 and the associated compliant capacitors 270 may be circular, ellipsoidal, or any other shape.

In each sense region 201, a positive curvature will induce positive strain in the angular displacement unit 220 for the respective sense region 201 that will increase the capacitance for the compliant capacitor 270 in the respective sense region 201. The capacitance may be a linear function of angular displacement between the two vectors defined by the ends 240 of the respective angular displacement unit 220.

The angular displacement of each sense region 201 may be determined independent from the angular displacement of other sense regions. In one embodiment, a change in electrical characteristics of angular displacement unit 220A in response to deformation (e.g., a bend or angular displacement) of the strand 212A in the sense region 201A is independent from a change in electrical characteristics of the angular displacement unit 220B in response to deformation of the strand 212A in the sense region 201B and independent from a change in electrical characteristics of the angular displacement unit 220C in response to deformation of the strand 212A in the sense region 201C. For example, the change in capacitance of compliant capacitor 270A (or electrical signal indicative of the capacitance) in response to a bend in sense region 201A is independent from the change in capacitance of compliant capacitor 270B and 270C associated with sense region 201B and 201C, respectively.

Multi-region angular displacement sensor 200C shows a cross section of a side view of a multi-region angular displacement sensor 200. Each angular displacement unit 220 includes two compliant capacitors, compliant capacitor 270 and 271, reflected about center axis 210C. The first compliant capacitor 270 (see multi-region angular displacement sensor 200B) is offset 260A a distance 't' from center axis 210C. The second compliant capacitor 271 is offset a distance 't' from center axis 210C in the opposite direction. Angular displacement unit 220A of multi-region angular displacement sensor 200C includes compliant capacitor 270A and 271A. Angular displacement unit 220B of multi-region angular displacement sensor 200C includes compliant capacitor 270B and 271B. Angular displacement unit 220C of multi-region angular displacement sensor 200C includes compliant capacitor 270C and 271C. Compliant capacitors 271 include two electrodes. Multi-region angular displacement sensor 200C is illustrated as embedded in strand 212C.

Sensitivity of a multi-region angular displacement sensor 200C may be increased by combining two compliant capacitors, such as compliant capacitor 270 and 271, reflected about center axis 210C. Reflecting compliant capacitor 270 and 271 about center axis 210C helps reject common mode signals resulting from noise and tensile strain. In each sense region 201, the difference in the capacitance between compliant capacitor 270 and 271 is proportional to the curvature of the respective sense region.

Multi-region angular displacement sensor 200D shows a cross section of a side view of a multi-region angular displacement sensor 200. Similar to multi-region angular displacement sensor 200C, each angular displacement unit 220 of multi-region angular displacement sensor 200D includes two compliant capacitors, compliant capacitor 270 and 271, reflected about center axis 210D. The compliant capacitors 270 and 271 of multi-region angular displacement sensor 200D include three electrodes, electrode 272A, electrode 272B, and 272C. Electrode 272A is disposed between electrodes 272B and 272C. Electrodes 272B and 272C may be coupled to a relative ground potential and function as a shield against noise or other parasitics. Multi-region angular displacement sensor 200D is illustrated as embedded in strand 212D.

It should be appreciated that FIG. 2 is provided for illustration rather than limitation. It should be further appreciated that features described herein may be combined, mixed, or eliminated with other features described herein. For example, multi-region angular displacement sensor 200 may include sense regions 201 or angular displacement units 220 that have non-rectangular shapes, such as V-like shapes or split shapes. Multi-region angular displacement sensor 200 may include angular displacement unit 220 orientated along different axes. For example, as discussed above, an angular displacement unit 220 may be orientated perpendicular to center axis 210, or in any other orientation. An angular displacement unit 220 may be orientated in any arbitrary orientation to measure angular displacement along an arbitrary axis and or may include any arbitrary number of additional planes of measurement. Additionally, compliant capacitors 270 and/or 271 may include one or more electrode configurations. For example, a first electrode of a compliant capacitor may be fully enclosed by a second electrode. In another example, an electrode of a compliant capacitor may be on the surface (or partially embedded) in strand 212 to help shield from noise and other parasitic signals. Other electrode configurations are discussed at least with respect to FIG. 7B. Multi-region angular displacement sensor 200 or strand 212 may be include compliant regions made from softer compliant material than surrounding regions, or material with cutouts for decreasing compliant, or material with reduced thickness compared to surrounding regions. In some embodiments, the traces 230 may be made with compliant conductive material and are embedded in strand 212. In still other embodiments, multi-region angular displacement sensor 200 may include one or more sense regions that include sense units with other sense elements, such as compliant strain sensors, compliant pressure sensors, or compliant electrodes (e.g., for measuring skin surface bio-potentials or skin conductivity). For example, a multi-region angular displacement sensor 200 that includes a sense region 201 with a compliant strain sensor may measure angular displacement in one or more sense regions 201 and strain in one or more sense regions 201.

Figure 3A:
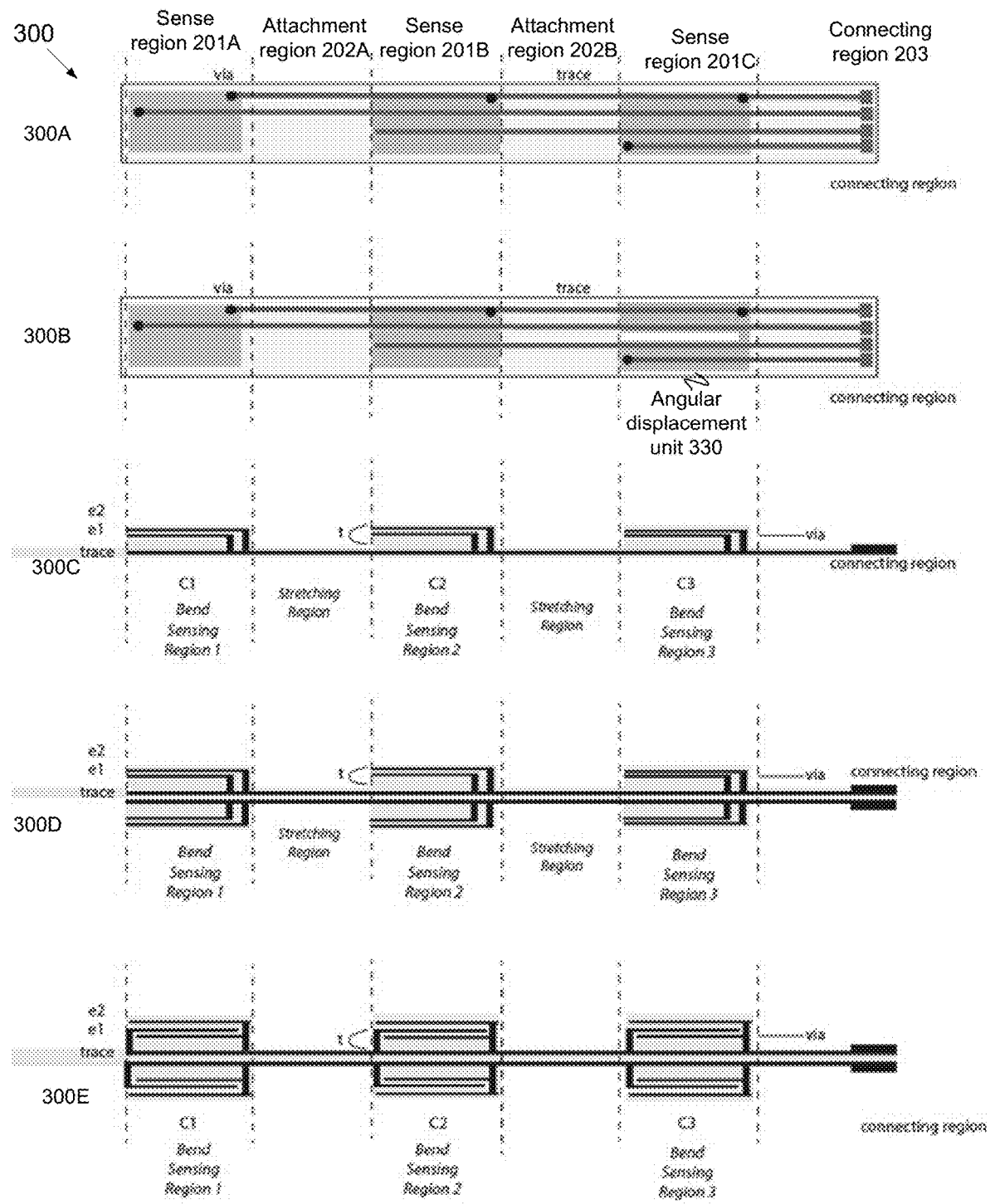
FIG. 3A illustrates different configurations of a multi-region angular displacement sensor, in accordance with other embodiments.

FIG. 3A illustrates different configurations of a multi-region angular displacement sensor, in accordance with other embodiments. Multi-region angular displacement sensor 300 includes several views of multi-region angular displacement sensors with different configurations. It should be noted that features that are described with respect to multi-region angular displacement sensor 200 apply to multi-region angular displacement sensor 300, unless otherwise described. Multi-region angular displacement sensor 300 illustrates a top view of multi-region angular displacement sensor 300A and 300B, a cross section of a side view of multi-region angular displacement sensor 300C, 300D, and 300E. Multi-region angular displacement sensor 300B illustrates sense region 201C with angular displacement unit 330 that includes a split shape sense element, such as a split shape compliant capacitor. In some embodiments, a split shape compliant capacitor may be used to measure angular displacement of the knuckles of the hand and may be formed to fit around the contours, or have a void cut within, so as to fit around a protruding knuckle while still measuring angular displacement. Multi-region angular displacement sensor 300C-300E shown attachment regions 202 that are stretching regions. The stretching regions may stretch responsive to tensile force and prevent all or some of the tensile force to be transferred to sense regions 201. Reducing the tensile force transferred to the sense regions 201 may allow angular displacement unit 220 to better detect angular displacement (e.g., bend) of an underlying object.

In one embodiment, multi-region angular displacement sensor 300E is a multi-region single axis angular displacement sensor manufactured with traces and vias. Multi-region angular displacement sensor 300E includes a strand (e.g., a compliant elongated member) with compliant traces embedded within. Multi-region angular displacement sensor 300E may have multiple sense regions. Each sense region may have an angular displacement unit with a three electrode compliant capacitor (e.g., first three electrode compliant capacitor) having two outer above and below an inner electrode. The outer electrodes may be connected to ground using vias made of conductive elastomer. It should be appreciated that the three electrode compliant capacitor may be referred to as a two electrode compliant capacitor where a first part of a first electrode is above the second electrode and a second part of the first electrode is below the second electrode. The three electrode compliant capacitor is offset from a center axis. The angular displacement unit also includes another three electrode compliant capacitor (e.g., second three electrode compliant capacitor) reflected about the center axis. Each sense region may measure angular displacement of the respective region. Each sense region may be connected to the connecting region by compliant traces. The dielectric elastomer (for the dielectric of the compliant capacitor and/or strand) is a thermoset silicone elastomer with a durometer of 10A-60A. The conductive elastomer of the three electrode compliant capacitor is a thermoset silicone elastomer with a durometer of 10A-60A with conductive micro or nano particles (e.g. carbon black or carbon nanotubes) dispersed within. The stretchable regions have a reduced thickness compared to the sense regions. It should be appreciated that multi-region angular displacement sensor 300A illustrates a top view of the current embodiment. Angular displacement is measured for each sense region using a differential capacitance measurement circuit, whereby common mode noise and signals (e.g. tensile strain) are canceled.

Figure 3B:
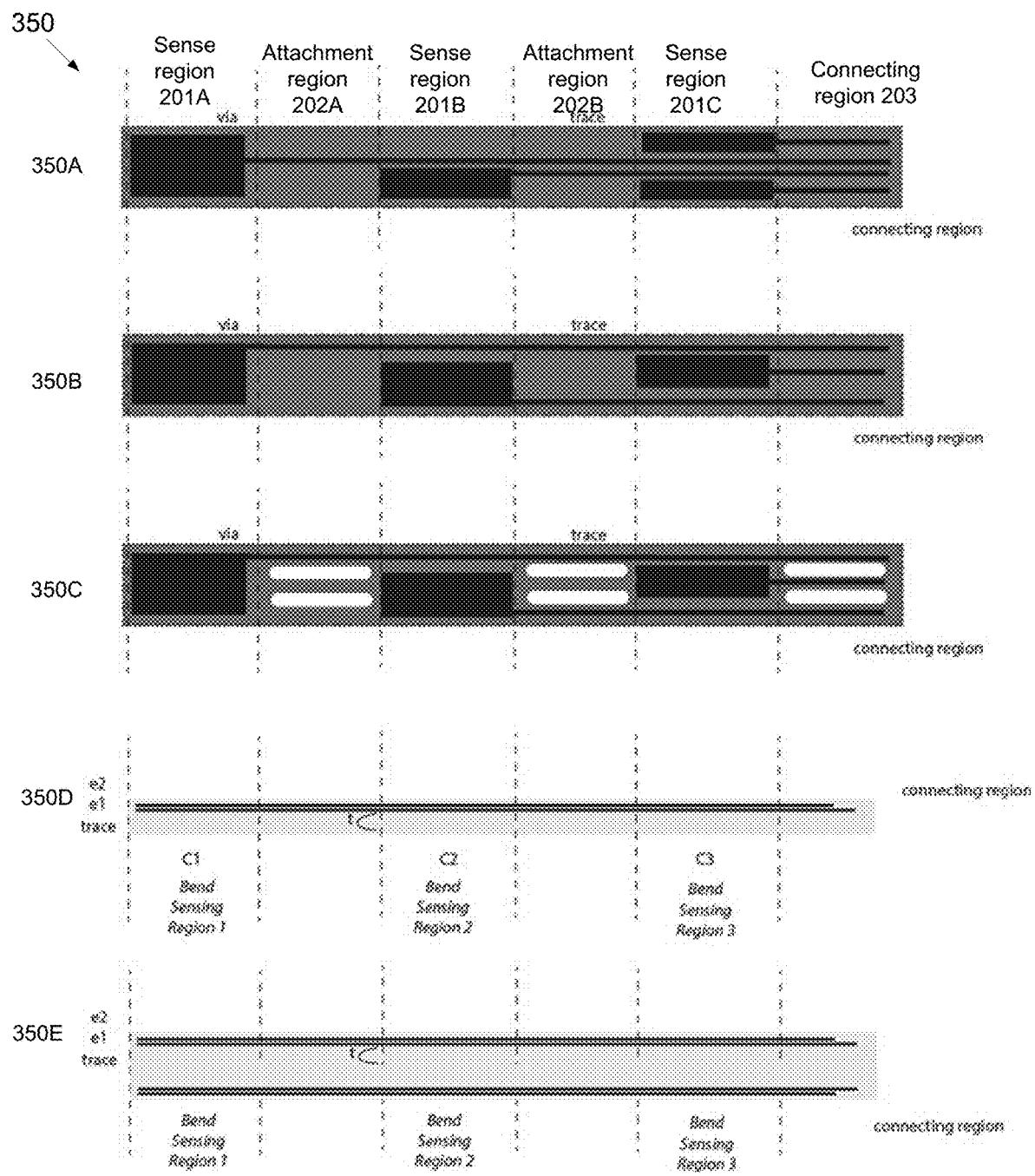
FIG. 3B illustrates different configurations of a multi-region angular displacement sensor, in accordance with some embodiments.

FIG. 3B illustrates different configurations of a multi-region angular displacement sensor, in accordance with some embodiments. Multi-region angular displacement sensor 350 includes several views of multi-region angular displacement sensors with different configurations. It should be noted that features that are described with respect to multi-region angular displacement sensor 200 apply to multi-region angular displacement sensor 350, unless otherwise described. Multi-region angular displacement sensor 350 illustrates a top view of multi-region angular displacement sensor 350A, 350B and 350C, a cross section of a side view of multi-region angular displacement sensor 350D and 350E. Multi-region angular displacement sensor 350A includes compliant capacitors and traces on a common plane. Sense region 201C of multi-region angular displacement sensor 350A illustrates a split electrode configuration (e.g., two respective compliant capacitors split apart) that are on a common plane. Multi-region angular displacement sensor 350B shows three compliant capacitors, one in each sense regions 201, with associated traces on a common plane. Multi-region angular displacement sensor 350C shows cut-outs (e.g., voids) in the attachment regions 202. In one embodiment, cut-outs may increase compliance (e.g., stretching) in the attachment regions 202, and may also act to center the sense region over a joint, such as a knuckle in a hand. Multi-region angular displacement sensor 350D shows a side-view of a multi-region angular displacement sensor with compliant capacitors and traces on a common plane. This configuration is optimized to measure angular displacement in multiple regions when tensile strain is minimal. Multi-region angular displacement sensor 350E shows the side-view of a multi-region angular displacement sensor with sense regions 201 included a pair of compliant capacitor, each of the pair of compliant capacitors and associated traces on a different and parallel common plane, which is optimized for reducing common mode noise and signals, such as tensile strain.

In one embodiment, multi-region angular displacement sensor 350A includes three sense regions 201. Each sense region 201 includes two compliant capacitors that are coplanar and reflected about the center axis or center plane. The compliant capacitors are connected to traces that are in plane with the electrodes of the compliant capacitors. The electrodes of the compliant capacitor include two patterned layers of conductive elastomer separated by a nonconductive dielectric elastomer, such that each angular displacement unit is routed to the connecting region using a trace patterned on the same plane (e.g., layer). The dielectric elastomer is a thermoset silicone elastomer with a durometer of 10A-60A. The conductive elastomer is a thermoset silicone elastomer with a durometer of 10A-60A with conductive micro or nano particles (e.g. carbon black or carbon nanotubes) dispersed within. Multi-region angular displacement sensor 350E may be a side view of the current embodiment. Angular displacement is measured for each sense region using a differential capacitance measurement circuit, whereby common mode noise and signals (e.g. tensile strain) are canceled.

Figure 4:
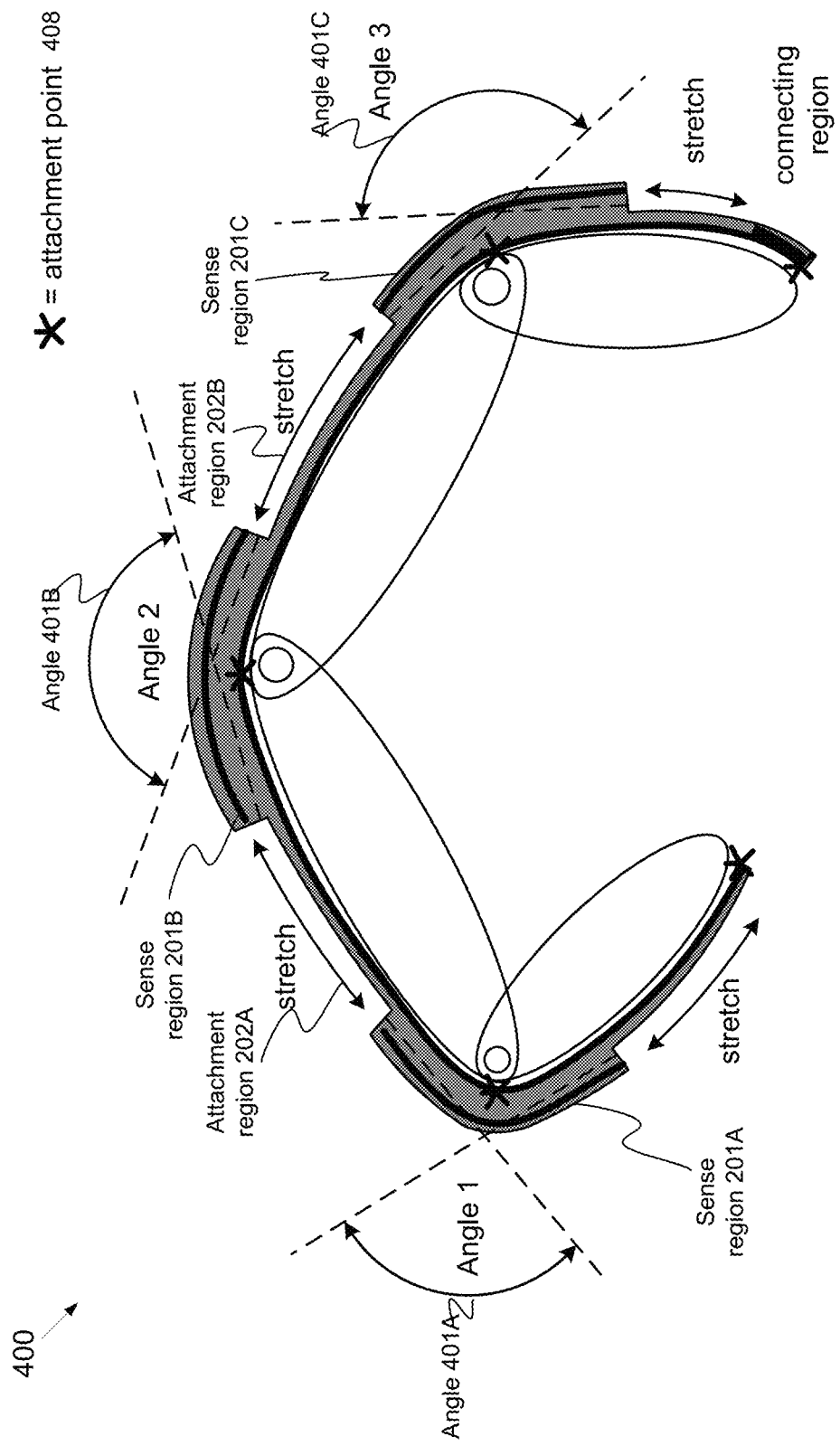
FIG. 4 illustrates an application of a multi-region angular displacement sensor, in accordance with some embodiments.

FIG. 4 illustrates an application of a multi-region angular displacement sensor, in accordance with some embodiments. For purposes of illustration, and not for limitation, the application of multi-region angular displacement sensor 400 illustrated in FIG. 4 is part of a glove (for a hand) where one or more fingers may contain one or more multi-region angular displacement sensors. It should be appreciated that multi-region angular displacement sensor 400 may be used in multiple applications to sense angular displacement. Any of the multi-region angular displacement sensors described herein may be used as multi-region angular displacement sensor 400. FIG. 4 illustrates a single finger. However, it should be appreciated that one or more multi-region angular displacement sensor 400 (with or without stretching regions) may be applied to some or all the joints of an entire hand.

Multi-region angular displacement sensor 400 shows three different angular displacement angles 401 (i.e., angle 401A, angle 401B, and angle 401C), that define the angular orientation of the four ellipsoidal rigid bodies. When the angles 401 are non-zero they will induce a curvature within the sense regions 201 and induce a strain (e.g., stretch) within the attachment regions 202. As the angles 401 are increased, the length of the attachment regions 202 along the top of the ellipsoidal rigid bodies will also increase. Attachment regions 202 are illustrated as stretching regions. In other embodiment, some or all of attachment regions 202 may not be stretching regions. Since the sense regions 201 are stiffer than the attachment regions 202, the sense regions 201 will deform primarily in curvature by bending, while the increase in length will be facilitated by the attachment regions 202. In one embodiment, the multi-region angular displacement sensor 400 with attachment regions 202 may be attached to the linked ellipsoidal rigid bodies at the five attachment points 408 designated with an asterisk. The attachment points 408 may help maintain the position of the sense regions 201 over the curved joint and help transmit the stretch to the attachment region 202. For example, the attachment points 408 may connect to an underlying glove beneath the multi-region angular displacement sensor 400. It should be appreciated than the attachment points 408 may be implemented any number of ways, such as by an adhesive substrate that sticks to the underlying ellipsoidal ridged bodies, may be a band that fits around the ellipsoidal ridged bodies. In some embodiment, no attachment points are implemented. In other embodiments, the same, fewer, or more attachment points are implemented. For each sense region 201, an angular displacement (i.e., angle 401A, angle 401B, and angle 401C), may be measured as a function of the change in capacitance, where the angular displacement is the angle between two vectors defined by the ends of the sense region 201 (e.g., angular displacement unit of the sense region 201). The angular displacement of each sense region 201 may be determined independent from the other sense regions. The sense element (e.g., compliant capacitor) is shown as a thick black line on the upper surface of multi-region angular displacement sensor 400, the traces are shown as a black line on a lower surface of multi-region angular displacement sensor 400, the strand of compliant material is gray, and the linked ellipsoidal rigid bodies are below the multi-region angular displacement sensor 400. In one example, the attachment region 202 may be made of the same material as the strand of compliant material, such as an elastomeric matrix, and/or be a different thickness from strand of compliant material the sense regions 201. In another example, the material of attachment region 202 may be a different material from the sense region 201 of multi-region angular displacement sensor 400, such as spandex or other elastic material.

Figure 5:
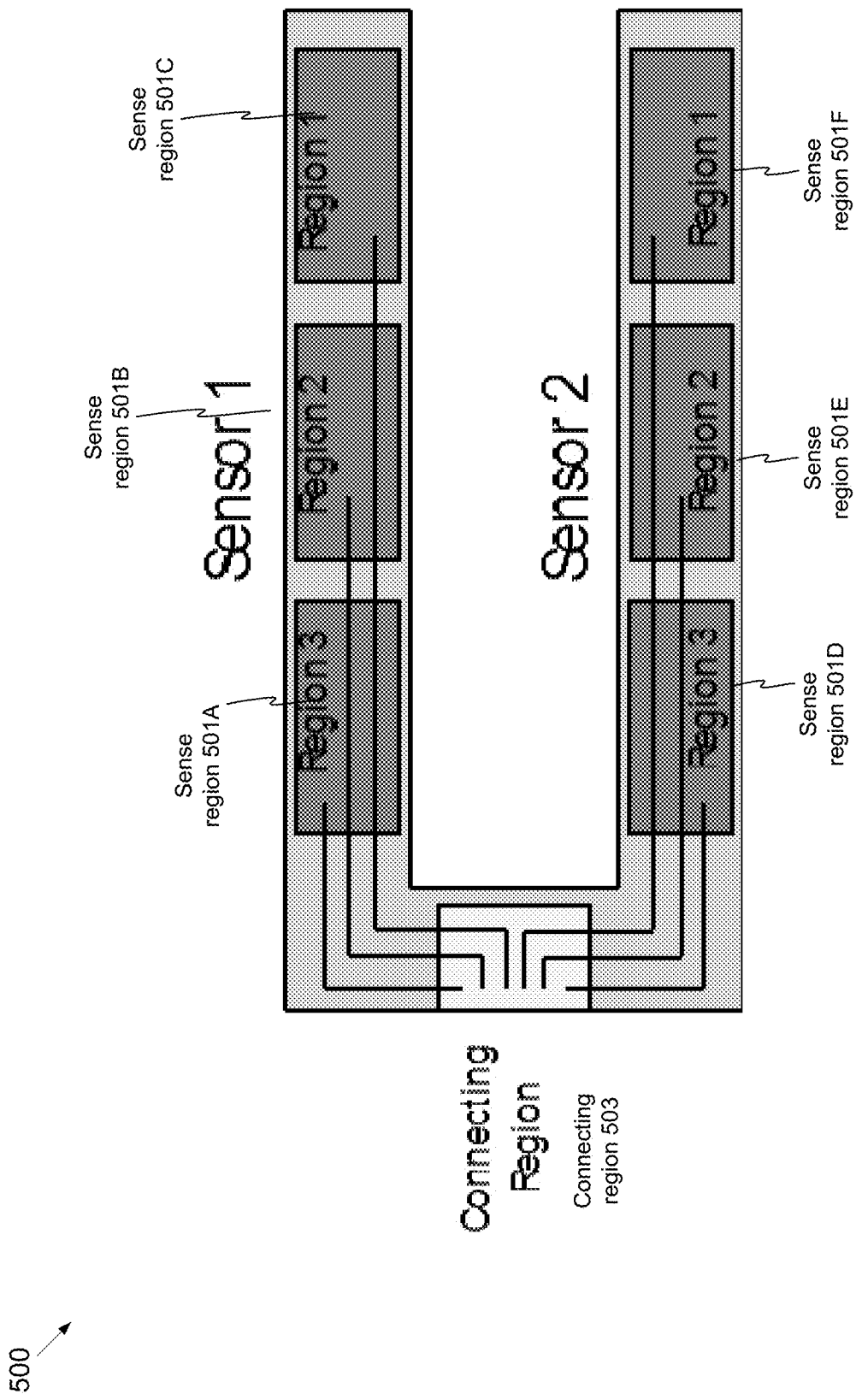
FIG. 5 illustrates a top view multi-region angular displacement sensor, in accordance with some embodiments.

FIG. 5 illustrates a top view of a multi-region angular displacement sensor, in accordance with some embodiments. Multi-region angular displacement sensor 500 includes six sense regions 501: sense region 501A, 501B, 501C, 501D, 501E, and 501F. The sense regions 501 may use a single connecting region, such as connecting region 503. All of some of the sense regions 501 may share connecting region 503. Sense region 501 may include fewer, the same, or more sense regions.

Figure 6:
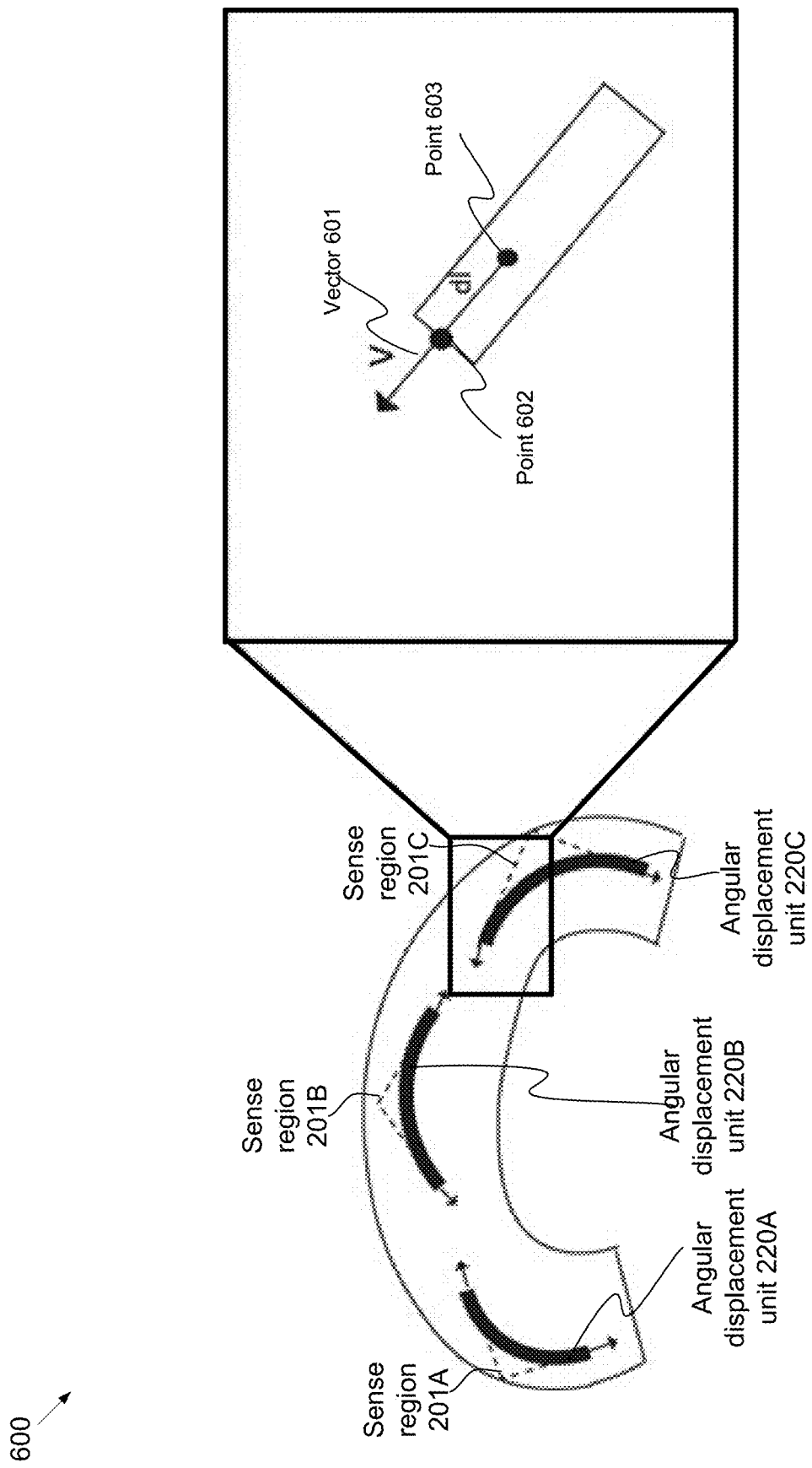
FIG. 6 illustrates vectors for determining angular displacement, according to some embodiments.

FIG. 6 illustrates vectors for determining angular displacement, according to some embodiments. Multi-region angular displacement sensor 600 is shown with three sense regions 201, sense region 201A, sense region 201B, and sense region 201C, illustrated as black curved rectangles. Each sense region 201 has a corresponding angular displacement unit 220A, 220B, and 220C. Each angular displacement unit 220 has two vectors (arrows) pointing from the ends of angular displacement unit 220. A vector 601 may be a line from a first point 602 where a center axis intersects a first plane at the end of the angular displacement unit 220C, where the first plane is perpendicular to the center axis, and through a second point 603 an infinitesimal distance away from the end of angular displacement unit 220C that is contained within a second plane, where the second plane is orthogonal to the first plane and runs through the center axis by bisecting the of angular displacement unit 220C along the length of the angular displacement unit 220C.

Figure 7A:
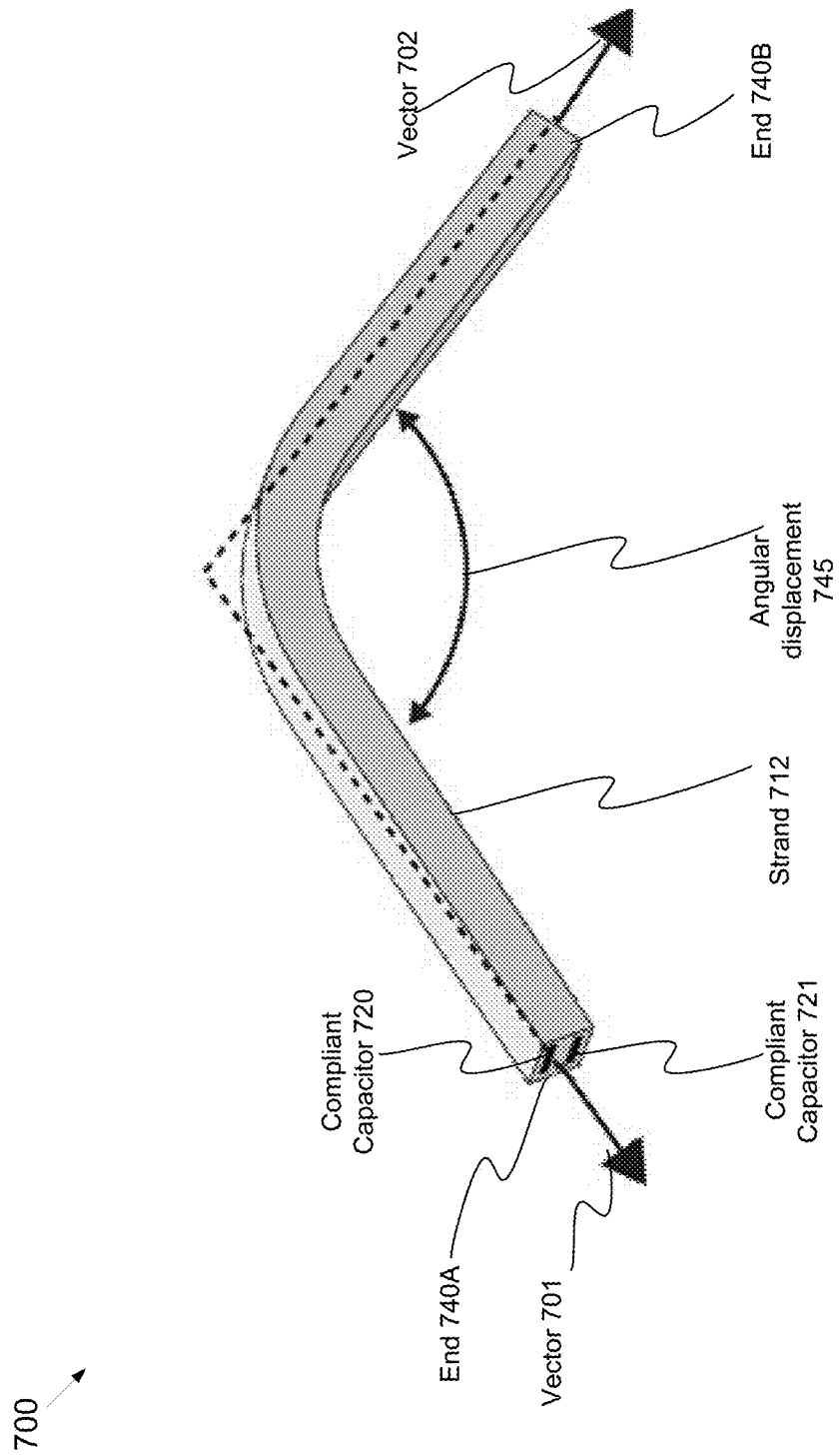
FIG. 7A illustrates a perspective view of an angular displacement unit, according to some embodiments.

FIG. 7A illustrates a perspective view of an angular displacement unit, according to some embodiments. In one embodiment, angular displacement unit 700 may be an angular displacement unit, as described herein. In another embodiment, angular displacement unit 700 may be angular displacement sensor (e.g., a single sense region angular displacement sensor). Angular displacement unit 700 illustrates a strand 712 of compliant material. Embedded in the strand 712 are compliant capacitor 720 and compliant capacitor 721 that are offset about a center axis (which is approximately where vector 701 and 702 are located). Vector 701 is located at end 740A of angular displacement unit 700. Vector 702 is located at end 740B of angular displacement unit 700. Vector 701 and 702 are used to measure angular displacement 745 (θ). Although two compliant capacitors are illustrated, one or more compliant capacitors may be implemented. Compliant capacitor 720 (and compliant capacitor 721) has two compliant electrodes separated by a compliant dielectric. Other electrode configurations will be discussed with respect to FIG. 7B. Additionally, additional placements of compliant capacitors will be discussed with respect to FIG. 7B. It should be appreciated that additional compliant capacitors may be implemented to measure angular displacement along any number of additional places of measurement.

FIGS. 7B and 7C illustrate cross sections of angular displacement units with different electrode configurations and electrode placements, according to some embodiments. In one embodiment, angular displacement unit 750 may be an angular displacement unit, as described herein. In another embodiment, angular displacement unit 750 may be an angular displacement sensor (e.g., a single sense region angular displacement sensor). Angular displacement unit 750 includes angular displacement unit 750A through 750M, each illustrating a different electrode configuration and/or electrode placement. In FIG. 7B, angular displacement units 750A through 750G show cross sections along the length (e.g., side view) of an angular displacement unit. In FIG. 7C, angular displacement units through 750H through 750M show cross sections along the width (e.g., end view) of corresponding angular displacement units (e.g., ends of an angular displacement unit)

Angular displacement unit 750A shows a single compliant capacitor 751A embedded in strand 755A and offset from center axis 753A. Compliant capacitor 751A is fully embedded in the strand 755A. Compliant capacitor 751A includes dielectric 757A disposed between electrode 760A and 760B. Angular displacement unit 750B includes compliant capacitor 751B. Compliant capacitor 751B includes dielectric layer 757B disposed between electrode 760C and 760E. Compliant capacitor 751B is offset from center axis 753B. Angular displacement unit 750B shows compliant capacitor 751B connected on top of the strand. For example, electrode 760E may adhere to strand 755B. In one embodiment, the top electrode 760C may be grounded and may help shield against noise. In some embodiments, the bottom electrode 760E of the compliant capacitor 751B may be embedded in the strand 755B and the top electrode 760C may be external to the strand 755B.

Angular displacement unit 750C includes compliant capacitor 751C. Compliant capacitor 751C includes three electrodes 760F, 760G, and 760H. Dielectric layer 757C is disposed between electrode 760F and 760G. Dielectric layer 757D is disposed between electrode 760G and 760H. Compliant capacitor 751C is offset from center axis 753C. In one embodiment, the top and bottom electrode (e.g., electrode 760F and 760H) may be grounded to help with shielding. Compliant capacitor 751C is connected on top (or partially embedded) in the strand 755C.

Angular displacement unit 750D includes compliant capacitor 751D. Compliant capacitor 751 includes three electrodes 760I, 760J, and 760K. Dielectric layer 757E is disposed between electrode 760I and 760J. Dielectric layer 757F is disposed between electrode 760J and 760K. Compliant capacitor 751D is offset from center axis 753D. In one embodiment, the top and bottom electrode (e.g., electrode 760I and 760K) may be grounded to help with shielding. Compliant capacitor 751D is connected on top (or partially embedded) in the strand 755D.

Angular displacement units 750E through 750G show a pair of compliant capacitors offset from the center axis (e.g., differential angular displacement units). The pair of compliant capacitors is reflected about the center axis and each of the compliant capacitor of the pair are parallel to one another. The pair of compliant capacitors may be used to make a differential measurement for angular displacement. The electrode configuration and electrode placement of angular displacement unit 750E is similar as described with respect to angular displacement unit 750B. Angular displacement unit 750E includes compliant capacitor 751E and 751F reflected about center axis 753E in strand 755E. The electrode configuration and electrode placement of angular displacement unit 750F is similar as described with respect to angular displacement unit 750C. Angular displacement unit 750F includes compliant capacitor 751G and 751H reflected about center axis 753F in strand 755F. The electrode configuration and electrode placement of angular displacement unit 750G is similar as described with respect to angular displacement unit 750D. Angular displacement unit 750D includes compliant capacitor 751I and 751J reflected about center axis 753G in strand 755G.

In FIG. 7C, angular displacement unit 750H, 750I, and 750J illustrate an angular displacement unit with two pairs of compliant capacitors having different electrode configurations and placement. The compliant capacitors associated with angular displacement unit 750H, 750I, and 750J are about a center axis 753J, 753I, and 753J, respectively. Center axis 753 runs through the middle of each strand 775. The first pair of compliant capacitor (i.e., top and bottom) associated with angular displacement unit 750H, 750I, and 750J may be used to measure angular displacement about a first plane than runs through the center axis and bisects the first pair of compliant capacitors. The second pair of compliant capacitor (i.e., right and left) associated with angular displacement unit 750H, 750I, and 750J may be used to measure angular displacement about a second plane that runs through the center axis and bisects the second pair of compliant capacitors. The electrode configuration and electrode placement of angular displacement unit 750H is similar as described with respect to angular displacement unit 750B. Angular displacement unit 750H includes compliant capacitor 771A, 771B, 771C, and 771D connected to strand 775H. The electrode configuration and electrode placement of angular displacement unit 750I is similar as described with respect to angular displacement unit 750C. Angular displacement unit 750I includes compliant capacitor 771E, 771F, 771G, and 771H connected to strand 775I. The electrode configuration and electrode placement of angular displacement unit 750J is similar as described with respect to angular displacement unit 750D. Angular displacement unit 750J includes compliant capacitor 771I, 771J, 771K, and 771L connected to strand 775J.

Angular displacement unit 750K, 750L and 750M show compliant capacitors with two electrodes where one electrode surrounds the other electrode. Angular displacement unit 750K includes compliant capacitor 771M. Compliant capacitor 771M includes a first electrode 780 that is surrounded by a rectangular second electrode 781. Electrode 781 may include side portion 781A, side portion 781B, top portion 781C and bottom portion 781D that surround the top, the sides, and bottom of the first electrode 780. In some embodiments, the ends (i.e., facing page) of the first electrode 780 are not surrounded by the second electrode 781. In other embodiments, one or more ends of the first electrode 780 are surrounded, at least partially, by the second electrode 781. For example, the electrode configuration of angular displacement unit 750K may be analogous to a coaxial cable where the first electrode 780 is analogous to the center cable of a coaxial cable and the second electrode 781 is analogous to the shield surrounding the center cable. The second rectangular electrode 781 may be grounded and help in shielding. It should be appreciated that electrode 780 and 781 may be any shape. For example, electrode 780 may be circular and electrode 781 may be larger circle that encloses electrode 780. Compliant capacitor 771M is embedded in strand 775K and offset from center axis 753K and center plane 782. Center plane 782 runs through center axis 753K and is coplanar to compliant capacitor 771M. It should be appreciated that although a center plane is not illustrated in every angular displacement unit described herein, a center plane may be included in some or all the angular displacement units described herein.

Angular displacement unit 750L shows two compliant capacitors 771N and 771O embedded in strand 775L. Compliant capacitors 771N and 771O may be similar to compliant capacitor 771M as described above. Compliant capacitor 771N and 771O are offset from and reflected about center axis 753L and center plane 783.

Angular displacement unit 750M shows two pairs of compliant capacitors about the center axis 753M to measure angular displacement about two orthogonal planes. Angular displacement unit 750M includes compliant capacitor 771P, 771Q, 771R, and 771S embedded in strand 775M. Compliant capacitor 771P, 771Q, 771R, and 771S may be similar to compliant capacitor 771M as described above. The first pair of compliant capacitors 771P and 771R (i.e., top and bottom) associated with angular displacement unit 750M are offset from and reflected about center axis 753M and center plane 784 and may be used to measure angular displacement about a first plane (e.g., center plane 785) than runs through the center axis 753 and bisects the compliant capacitors 771P and 771R. The second pair of compliant capacitor 771Q and 771S (i.e., right and left) are offset from and reflected about center axis 753 and center plane 785 and may be used to measure angular displacement about a second plane (e.g., center plane 784) that runs through the center axis 753M and bisects the second pair of compliant capacitors 771Q and 771S. It should be appreciated that the electrode configuration and placement on a single angular displacement unit or in a multi-region angular displacement sensor may incorporate one or more of the configurations and or placements described herein.

Figure 8:
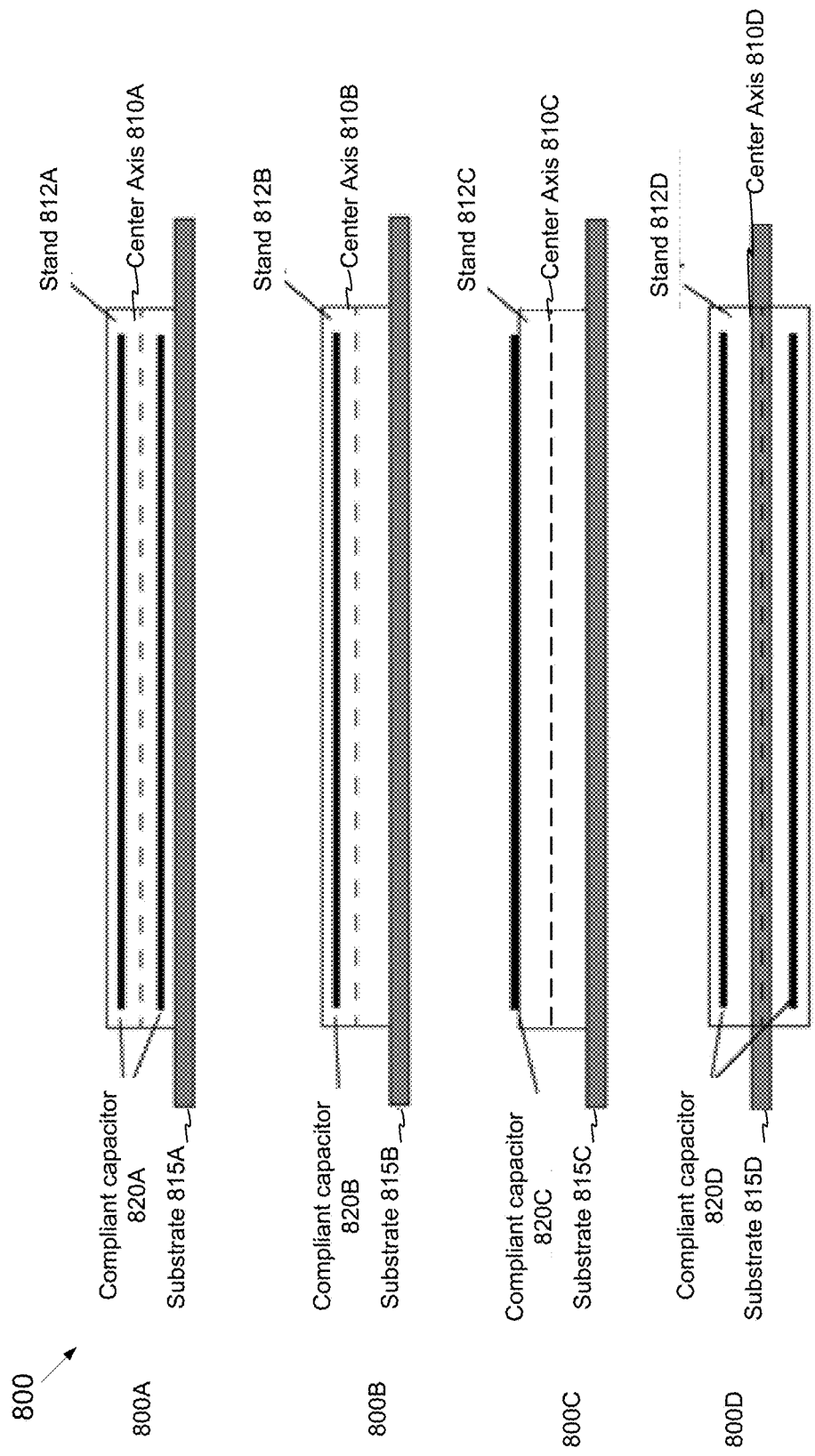
FIG. 8 illustrates a side view of a cross section of an angular displacement unit, according to other embodiments.

FIG. 8 illustrates a side view of a cross section of an angular displacement unit, according to other embodiments. In one embodiment, angular displacement unit 800 may be an angular displacement unit, as described herein. It should be appreciated that angular displacement unit 800 may be part of a multi-region angular displacement sensor. In another embodiment, angular displacement unit 800 may be angular displacement sensor (e.g., a single sense region angular displacement sensor). Angular displacement unit 800 illustrates several configurations including angular displacement unit 800A, 800B, 800C, and 800D. Angular displacement unit 800A includes a pair of compliant capacitors 820A offset about center axis 810A. Compliant capacitors 820A are embedded in strand 812A of compliant material, such as a compliant matrix. Angular displacement unit 800A is connected to substrate 815A. A substrate, such substrate 815A, may be a compliant material, such as a compliant elastomer or fabric material. A fabric substrate may made of spandex, a woven material, or non-woven material. In some embodiments, the substrate may have an adhesive on at least one side to connect to a surface, such as human skin around a joint or other surface.

Angular displacement unit 800B includes a compliant capacitor 820B offset about center axis 810B. Compliant capacitor 820B is embedded in strand 812B of compliant material. Angular displacement unit 800B is connected on top of substrate 815B. Angular displacement unit 800C includes a compliant capacitor 820C offset about center axis 810C. Compliant capacitor 820C is connected to a top surface of strand 812C of compliant material. Angular displacement unit 800C is connected on top of substrate 815C. Angular displacement unit 800D includes a pair of compliant capacitors 820D offset about center axis 810D. Compliant capacitors 820D are embedded in strand 812D of compliant material. Substrate 815D may be embedded in strand 812. In another embodiment, a top half of strand 812D may be connected to the top of substrate 815D and a bottom half of strand 812D may be connected to the bottom side of substrate 815D.

Figure 9:
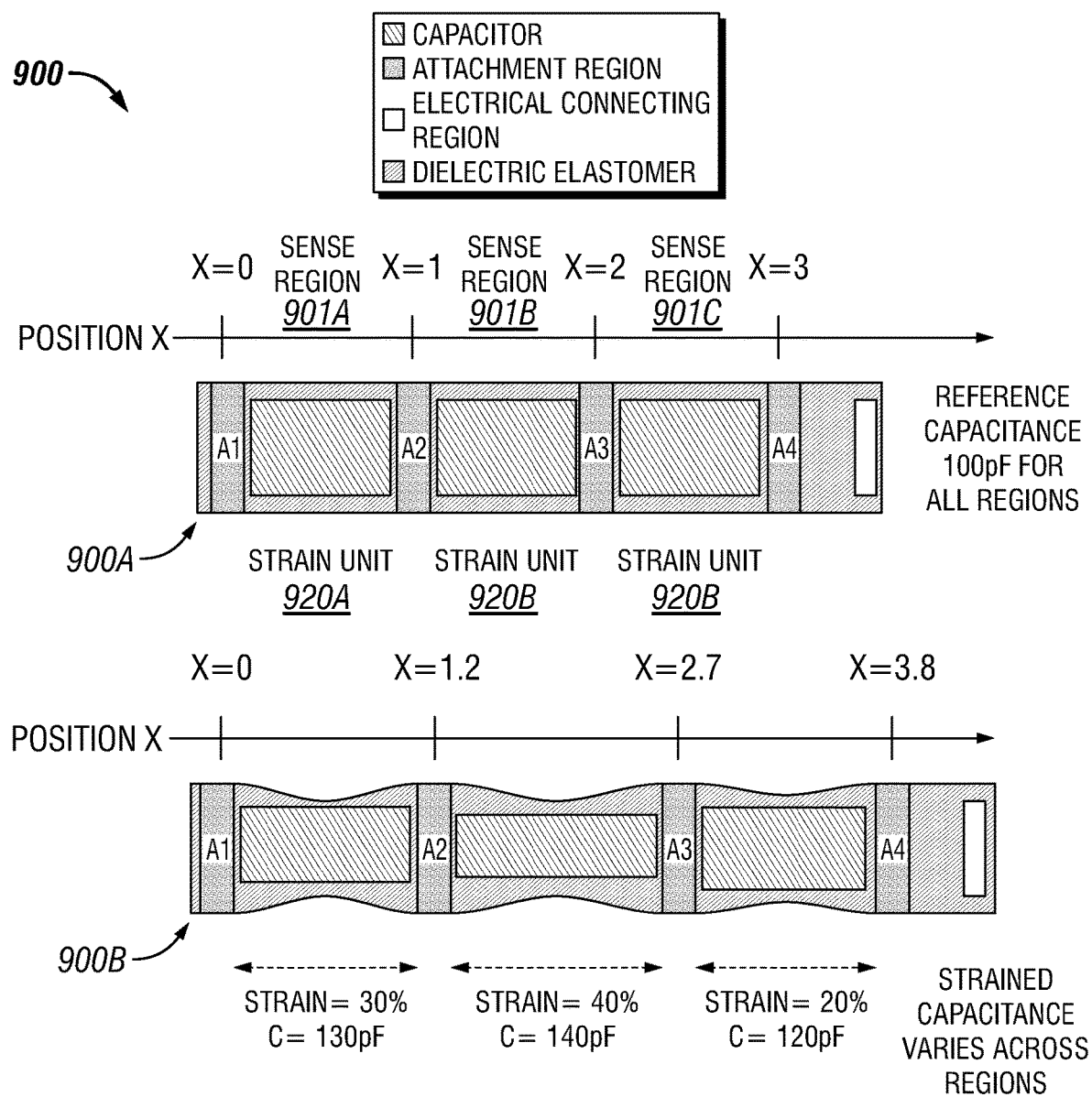
FIG. 9 is an illustration of a multi-region strain sensor, in accordance with some embodiments.

FIG. 9 is an illustration of a multi-region strain sensor, in accordance with some embodiments. Multi-region strain sensor 900 may include similar features as multi-region angular displacement sensor, unless otherwise described.

Multi-region strain sensor 900 includes multiple sense regions 901 including sense region 901A, 901B, and 901C. Each sense region 901 includes a strain unit 920 (e.g., stretch sensor). Sense region 901A includes strain unit 920A, sense region 901B includes strain unit 920B, and sense region 901C includes strain unit 920B. Strain units 920 are compliant and deform similarly to an angular displacement unit. Strain units 920 may measure strain responsive to a tensile force (e.g., stretch).

Each sense region 901 may include one or more sense elements, such as a compliant capacitor, and may sense strain independently. Sense region 901 may deform proportionally to the applied strain. In some embodiments, attachment regions (e.g., a1-a4) are located between the one or more sense elements. Attachment regions of multi-region strain sensor 900 may be similar to the attachment regions described with respect to multi-region angular displacement sensor described herein. In another embodiment, attachment regions may be located on top of the sense elements. The attachment regions may provide an attachment point to which the multi-region strain sensor 900 may be secured to a surface. In one embodiment, the attachment region of multi-region strain sensor 900 may have limited or no elasticity, so that tensile force may be imparted to strain units 920. Once attached, the attachment region may provide a boundary so that a load may be applied and strain induced on a sense element. For example, a sense element may lie over a joint and an attachment region may be secured at a position above the joint and another attachment region may be secured below the joint. When the joint flexes, the flex induces a strain on the sense element, rather than in the attachment region. The attachment region may be made of any material, such as non-conducting elastomer or another non-conducting material. The attachment region may be secured to another surface by any material, such as glue, a staple, or thread-like material. The multi-region strain sensor 900A illustrates the sense elements in a state of negligible strain. Multi-region strain sensor 900B illustrates the sense elements under different amounts of strain (e.g., 30%, 40%, and 20%). The percentage of strain is an indication of the amount of deformation (i.e., change in area) of each sense element from a negligible strain state to a strained state. A change in distance between the attachment regions induces a strain within the sense element. For example, if the reference capacitance (no deformation) for each sense region 901 is 100 pF, the capacitance resulting from the applied strain (shown as x values on the axis on the top of multi-region strain sensor 900) may result in a proportional increase in capacitance for each sense element. Although multi-region strain sensor 900 illustrates a multi-region strain sensor with three sense regions 901, it should be appreciated that multi-region strain sensor may have any number of sense regions 901. It should also be appreciated that a multi-region sensor may include one or more sense regions with angular displacement units, one or more sense regions with strain units, and/or any one or more sense regions with other types of sense units.

Figures 10A, 10B:
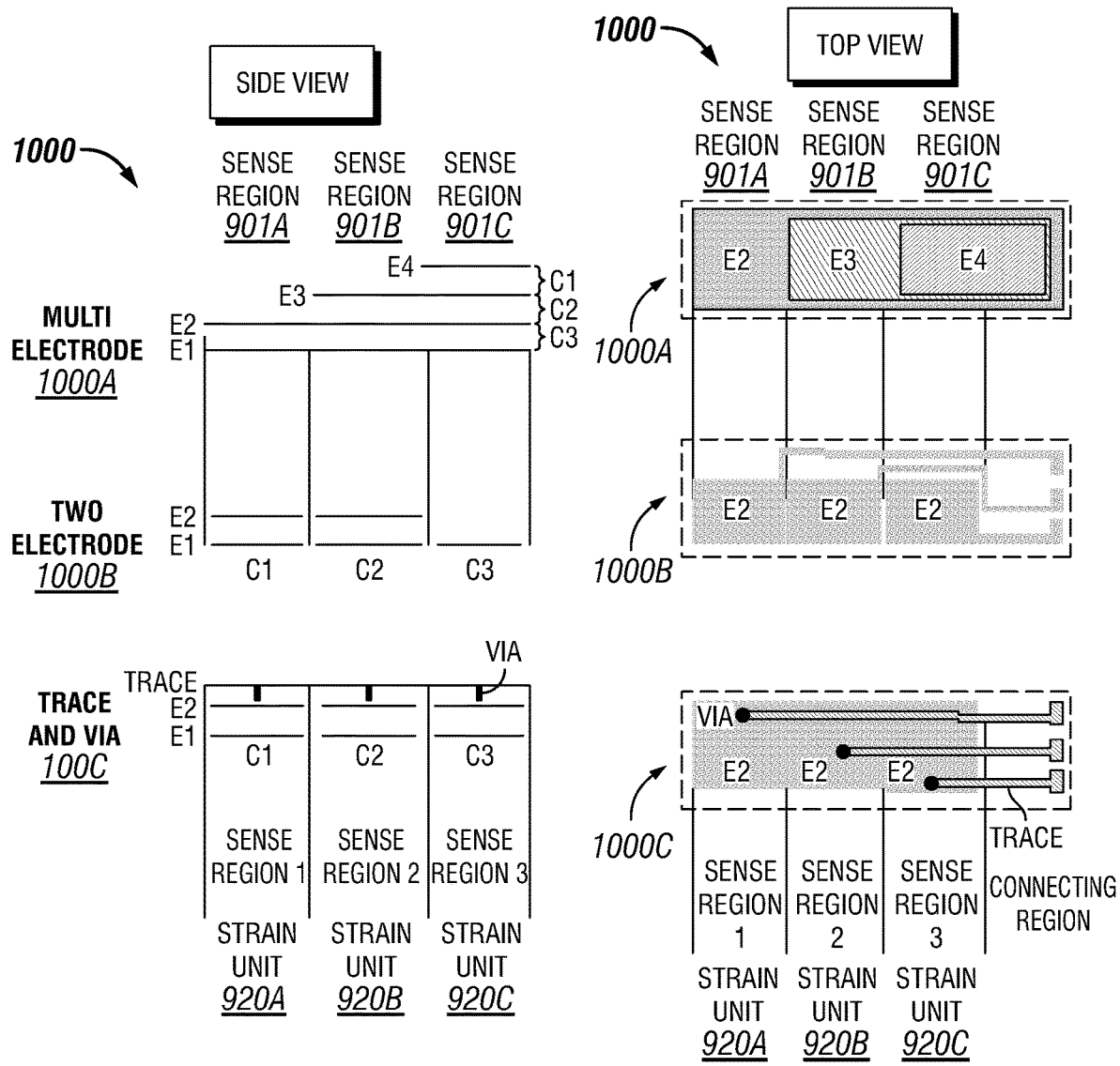
FIGS. 10A and 10B illustrate a side view and top view, respectively, of a multi-region strain sensor with different configurations, in accordance with some embodiments.

FIGS. 10A and 10B illustrate a side view and top view, respectively, of a multi-region strain sensor with different configurations, in accordance with some embodiments. Multi-region strain sensor 1000 may illustrate different configurations of multi-region strain sensor 900 described with respect to FIG. 9, as well as include similar features as described with respect to multi-region strain sensor 900. Multi-region strain sensor 1000 includes multi-region strain sensor 1000A, multi-region strain sensor 1000B, and multi-region strain sensor 1000C. Multi-region strain sensor 1000 includes sense region 901A, 901B, and 901C. Each sense region 901 includes a respective strain unit 920A, 920B, and 920C. Each multi-region strain sensor 1000A, 1000B, and 1000C shows a side view and top view of the respective multi-region strain sensor.

In one embodiment (i.e., top row), multi-region strain sensor 1000A includes multiple overlapping electrodes, such as elastomeric electrodes, of compliant capacitors. The electrodes may be separated by a dielectric, such as an elastomeric dielectric. The electrodes may be layered on different planes relative to a vertical axis, as illustrated in the side view of multi-region strain sensor 1000A. The compliant capacitor C1 is formed from electrodes e4 and e3 and may measure strain in sense region 901C. Compliant capacitor C2 is formed from e3 and e2 and may measure strain within sense region 901C and sense region 901B. The compliant capacitor C3 is formed from e2 and e1 and may measure strain within sense region 901C and sense region 901B and sense region 901A. Strain within a single sense region 901 may be found by subtracting the capacitance from the other sense regions 901. In the side view of multi-region strain sensor 1000A, the electrodes are horizontal black lines. In the top view of multi-region strain sensor 1000A, the top three electrodes are shown in varying shades of gray, with the whole multi-region strain sensor 1000A outlined in a dotted line.

In another embodiment (i.e., middle row), multi-region strain sensor 1000B includes two electrode layers forming separate compliant capacitors in each sense region 901. The traces may be in the same plane as the top electrodes (e2) the bottom electrodes (e1). In still another embodiment (e.g., bottom row), multi-region strain sensor 1000C shows conductive traces on a third plane that connect to the top electrodes (e2) through compliant vias. The traces and vias may be composed of a variety of materials, such as conductive fillings and conductive elastomers. It should be appreciated that any combination of features described herein may be used in the configuration of a multi-region strain sensor.

Figure 11:
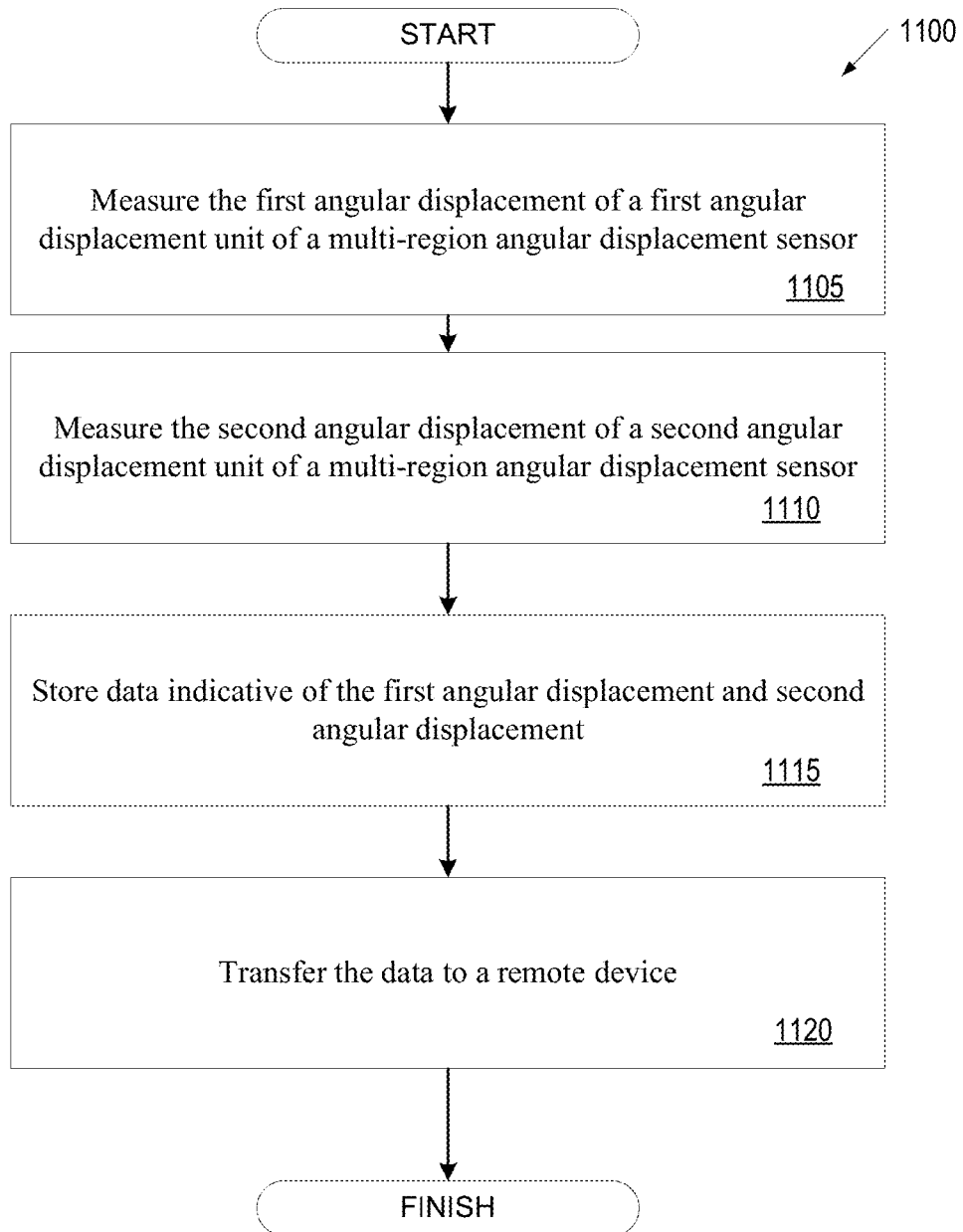
FIG. 11 illustrates a flow diagram of a method of measuring movement of an anatomical joint of a user using a multi-region angular displacement sensor, in accordance with some embodiments.

FIG. 11 illustrates a flow diagram of a method of measuring movement of an anatomical joint of a user using a multi-region angular displacement sensor, in accordance with some embodiments. The multi-region angular displacement sensor may include similar components as described herein, for example multi-region angular displacement sensor 200 with respect to FIG. 2, multi-region angular displacement sensor 300 with respect to FIG. 3A, multi-region angular displacement sensor 350 with respect to FIG. 3B, and/or multi-region strain sensor 900 with respect to FIG. 9. Method 1100 may be performed all or in part by processing logic that comprises hardware (e.g., circuitry, dedicated logic, programmable logic, microcode), software (e.g., instructions run on a processing device to perform hardware simulation), or a combination thereof. In one embodiment, an interface device performs all or part of method 1100.

The method 1100 includes providing a multi-region angular displacement sensor with multiple sense regions. A first sense region includes a first angular displacement unit, the ends of which define two vectors with respect to a center axis (e.g., angular displacement axis). A second sense region includes a second angular displacement unit, the ends of which define two other vectors with respect to a center axis. The multi-region angular displacement sensor may be connected to a strand of compliant material. The first and second sense regions may measure angular displacement independently.

The method 1100 can also include positioning the first sense region proximate to a first anatomical joint of a user. The method 1100 can further include positioning the second sense region proximate to a second anatomical joint of the user. Sense regions may extend over the first and/or second anatomical joint of the user or be place near (e.g., sides) the first and/or second anatomical joint.

The method 1100 at block 1105 can also include measuring an angular displacement about a first plane that is defined between the first pair of vectors of the first angular displacement unit when the angular displacement unit is moved from the linear and non-bent position to a bent position via a movement of the first anatomical joint by the user. In some embodiments, measuring the angular displacement about a plane, such as the first plane, includes measuring with a differential measuring circuit associated with the multi-region angular displacement sensor. An angular displacement unit may include at least one compliant capacitor having a width extending along the longitudinal length of the strand, as described herein. In further embodiments, measuring the angular displacement about a plane includes measuring a change in the angular displacement in the plane between the pair of vectors defined by the ends of the angular displacement unit. In one embodiment, a circuit device, such as an interface device coupled to the multi-region angular displacement sensor, may determine an angular displacement between the first vector and the second vector by measure a signal (e.g., analog signal indicative of a capacitance of a compliant capacitor) associated with a compliant capacitor of the angular displacement unit. The circuit device may convert the signal to a digital value indicative of the capacitance of the compliant capacitor.

In some embodiments, the method 1100 may also include generating biofeedback signals to a user based on the measured angular displacement meeting input parameters with at least one of an audible notification, a visual notification, and a vibrational tactile notification. It should be noted that and angular displacement unit may measure the angular displacement about different planes with an addition of one or more compliant capacitors, as discussed herein.

The method 1100 at block 1110 can also include measuring an angular displacement about a second plane that is defined between the second pair of vectors of the second angular displacement unit when the angular displacement unit is moved from the linear and non-bent position to a bent position via a movement of the second anatomical joint by the user. The method 1100 at block 1110 may be perfumed similarly to block 1105.

The method 1100 may also include performing a calibration of the multi-region angular displacement sensor that accounts for misalignment between the ends of the angular displacement unit and the anatomical axis of the anatomical joint being measured.

In some embodiments, the method 1100 at block 1115 includes storing data in an interface device coupled to the multi-region angular displacement sensor. The method 1100 at block 1120 may also include transferring the data to a remote device, wirelessly or otherwise. The interface device may be secured to a user or object (not shown) and include various electronic components, such as a micro-controller and memory, for receiving data relative to an angular displacement, discussed in further detail herein. Further, the interface device may be operatively coupled to a remote device for a user to view and analyze the data received from the interface device.

Figure 12:
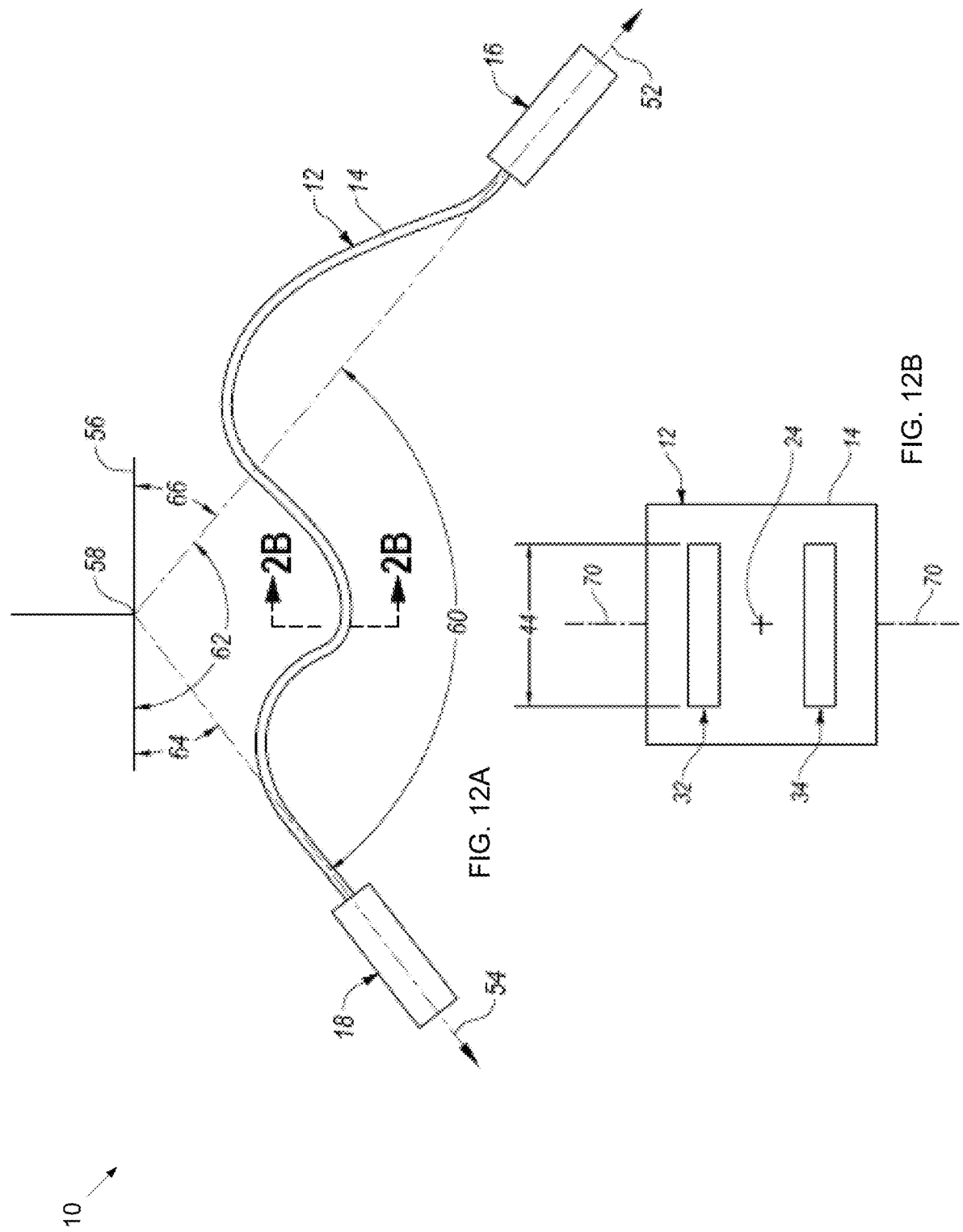
FIG. 12A illustrates an angular displacement unit, in accordance with another embodiment.
FIG. 12B illustrates another view of the angular displacement unit of FIG. 12A, in accordance with another embodiment.

FIG. 12A illustrates an angular displacement unit, in accordance with another embodiment. It should be appreciated that angular displacement unit 12 may also be an angular displacement sensor. Sensor system 10 is depicted in a bent position, rather than a linear and non-bent position. The sensor system 10 may include angular displacement unit 12 that may be an elastomer based material embedded into a strand 14 of compliant material that is highly flexible and/or bendable. The sensor system 10 may include a strand 14 of compliant material. Strand 14 may be a compliant material that is flexible and bendable from a linear, non-bent position to multiple bendable positions. The first and second ends of the angular displacement unit 12 are embedded within or attached to the respective first and second rigid members 16, 18 that may be somewhat elongated and preferably symmetrically formed around the first and second ends of the angular displacement unit 12. The rigid members 16, 18 may fully or partially embed the angular displacement sensor ends. Alternatively, the rigid members 16, 18 may be embedded within the angular displacement sensor ends either partially or fully. In other embodiments, no rigid members 16, 18 are implemented. Furthermore, the rigid members 16, 18 may take the form of adhesives, screws, welds, or other form of attachments between the angular displacement unit 12 ends and a substrate to which the angular displacement unit 12 is attached. The substrate to which the angular displacement unit 12 is attached may include plastic, metal, ceramics, fabric, elastomers and the like. In one embodiment, the first and second rigid members 16, 18 may define a first vector 52 and a second vector 54, respectively. In another embodiment the ends of angular displacement unit 12 may define a first vector 52 and a second vector 54. In the linear non-bended position, the first and second vectors 52, 54 may be substantially co-axial with the horizontal line 56.

In the non-linear and bended position, the first and second rigid members 16, 18 (and/or ends) may become displaced such that the strand 14 of compliant material is non-linear or moved to a bent position. In this bent position, the first and second vectors 52, 54 define an angle or, otherwise referenced herein as, an angular displacement 60 between the first and second rigid members 16, 18 (and/or ends). In one embodiment, the angular displacement 60 may be determined from, for example, a horizontal line 56, relative or parallel to an axis of the angular displacement unit 12 in the linear position, taken from an intersection 58 of the first and second vectors 52, 54. As such, the angular displacement 60 may be equal to a first vector angle 62 minus a second vector angle 64, in which the first vector angle 62 may be defined between the horizontal line 56 and the first vector 52 and the second vector angle 64 may be defined between the horizontal line 56 and the second vector 54. Other angles, such as an acute angle 66 defined between the second vector 54 and the horizontal line 56, may also be of interest and may have need to be analyzed, which may readily be calculated as a parameter. In this manner, the sensor system 10 may provide measurement data to calculate the angular displacement 60 between the first and second vectors 52, 54. The angular displacement unit 12 also may provide measurement data as to the change in the angular displacement 60 over time as well a rate of change of the angular displacement 60 between the first and second vectors 52, 54.

In one embodiment where angular displacement unit 12 implements two parallel compliant capacitors, the angular displacement 60 is measured, as well as each of the above noted angles, with a differential measurement based on the capacitance output of the first and second compliant capacitors along the length of the strand 14 of compliant material or angular displacement unit 12. The angular displacement 60 is detected by measuring the capacitance between the inner and outer electrodes of each of the first and second compliant capacitors. The differential measurement of the first and second compliant capacitors increases the sensitivity and reduces common mode noise. In some embodiments, the first and second compliant capacitors are spaced in a parallel manner such that a sensitivity of the angular displacement is increased. The first and second compliant capacitors are offset from a center axis of and are reflected about the center axis. In some embodiments where the angular displacement unit 12 includes a single compliant capacitor, the angular displacement 60 is detected by measuring the capacitance between the inner and outer electrodes of the single compliant capacitor.

Upon sensor system 10 being in a linear and non-bent position, the measurement data transmitted from the angular displacement unit 12 will indicate substantially no angular displacement. The same is true upon the first and second rigid members 16, 18 (or ends of angular displacement unit 12) being parallel with each other since any positive/negative capacitance generated due to bending in the angular displacement unit 12 will cancel each other out. On the other hand, upon the rigid members 16, 18 (and/or ends) being moved to an orientation that is non-coaxial or non-parallel, such as that shown in FIG. 12A, the capacitance measurements provided by the angular displacement unit 12 may provide an angular displacement 60 relative to the orientation between the first and second vectors 52, 54.

FIG. 12B illustrates another view of the angular displacement unit of FIG. 12A, in accordance with another embodiment. In one embodiment, angular displacement 60 is calculated along and within a first plane 70 or a projection or component of the first plane 70 relative to the first and second rigid members 16, 18 and the angular displacement unit 12. In another embodiment, angular displacement 60 is calculated along and within a first plane 70 or a projection or component of the first plane 70 relative to the ends and the angular displacement unit 12. Due to the flexibility of the strand 14 of compliant material, the first and second rigid members 16, 18 and/or strand 14 of compliant material may extend out of the first plane 70 and, thus, the angular displacement 60 that may be measured may be a projection or components of the first plane 70 relative to the actual position of the angular displacement unit 12. The first plane 70 may be defined as a plane corresponding with and/or extending along the center axis 24 of the angular displacement unit 12 and extending substantially orthogonal to the width 44 of the first and second compliant capacitors 32, 34 of the angular displacement unit 12. The width 44 of angular displacement unit 12 may be defined as the dimension orthogonal to the longitudinal length, the width 44 and length dimensions extending within the same plane.

Furthermore, the angular displacement 60 may be defined solely by the angle between the first and second vectors 52, 54. The sensor system 10 may provide measurement data for the angular displacement 60 relative to the first and second vectors 52, 54 and is insensitive to the path of the angular displacement unit 12, including any wrinkles, kinks, out of plane bending, etc. of the angular displacement unit 12 itself. For example, in FIG. 12A, the angular displacement unit 12 is bent similar to an "M" configuration. However, as set forth, the differential measurement of the first and second compliant capacitors 32, 34 is limited to the angular displacement 60 of the first and second vectors 52, 54.

Figure 13:
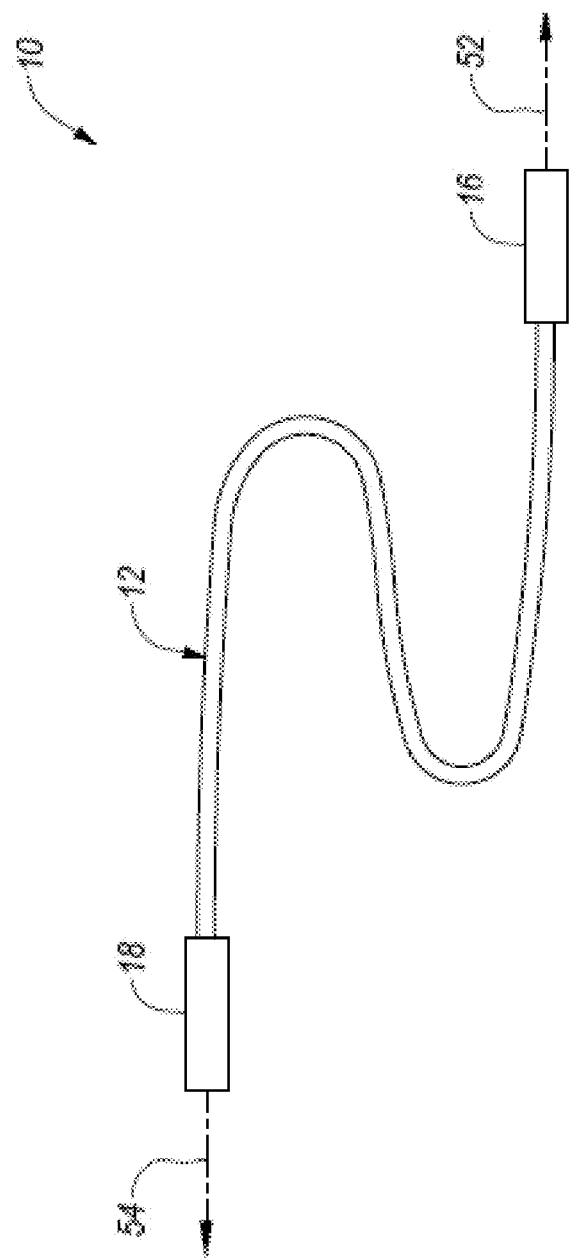
FIG. 13 illustrates an angular displacement unit, according to another embodiment.

FIG. 13 illustrates an angular displacement unit, according to another embodiment. The angular displacement unit 12 of the sensor system 10 is shown being bent in several locations similar to an "S" configuration. However, in this "S" configuration, the first and second vectors 52, 54 are substantially parallel to each other and, thus, there is no angular displacement between the first and second vectors 52, 54. In this manner, the positive and negative capacitance measurements of the angular displacement unit 12 in the differential measurement would cancel each other out to provide measurement data with no angular displacement between the first and second vectors 52, 54.

Figure 14:
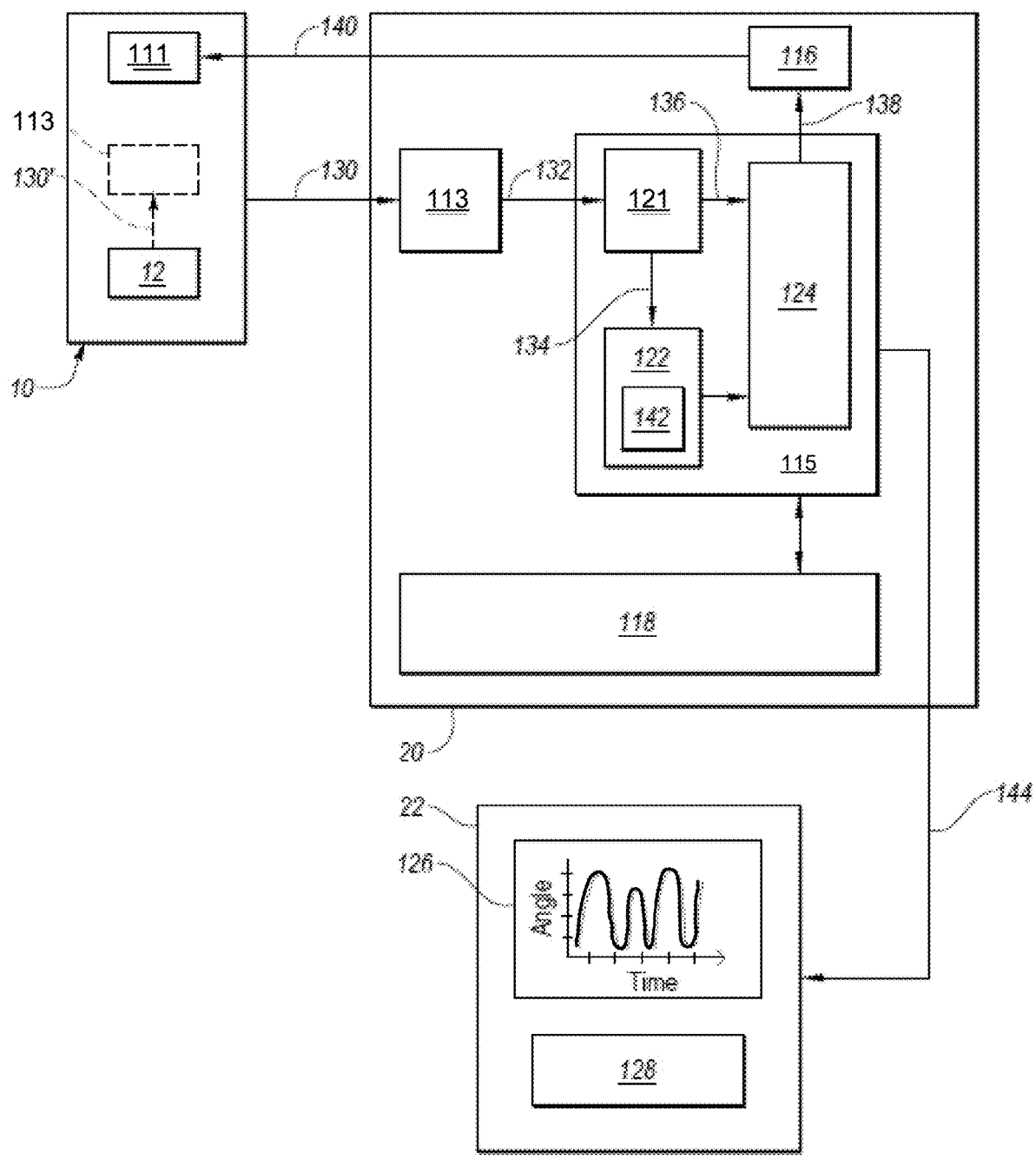
FIG. 14 illustrates a schematic diagram of various components of a system for analyzing data relative to angular displacement, according to one embodiment.

FIG. 14 illustrates a schematic diagram of various components of a system for analyzing data relative to angular displacement, according to one embodiment. In one embodiment, the primary components may include the sensor system 10 (e.g., multi-region angular displacement sensor and/or multi-region strain sensor), the interface device 20 (all or part also referred to as circuit device), and the remote device 22. The sensor system 10 may include the angular displacement unit 12 (e.g., a single angular displacement unit or one or more angular displacement units of a multi-region angular displacement sensor described herein) and a biofeedback device 111. The interface device 20 may include a capacitance measurement circuit 113, a micro-controller 115, a biofeedback amplifier 116, and a user interface 118. The micro-controller 115 may include a calculation circuit 121, a memory 122, and control and analysis software 124. The remote device 22 may include a display 126 and user input 128, and may include the processors and computing devices of, for example, a smart phone or personal computer, as known in the art. In other embodiments, the micro-controller 115 may include both analog and digital circuitry to perform the functionality of the capacitance measurement circuit 113, the calculation circuit 121, and biofeedback amplifier 116. In some embodiments, interface device 20 may be a processing device, such as a microprocessor or central processing unit, a controller, special-purpose processor, digital signal processor ("DSP"), an application specific integrated circuit ("ASIC"), a field programmable gate array ("FPGA"), or one or more other processing devices known by those of ordinary skill in the art.

In use, for example, upon bending movement of the angular displacement unit 12, the capacitance measurement circuit 113 measures capacitances of the compliant capacitors, such as compliant capacitor 32, 34 of the angular displacement unit 12. As illustrated in FIG. 14, the capacitance measurement circuit 113 can be housed in the interface device 20 and coupled to the angular displacement unit 12 via wires, as indicated by arrow 130. Alternatively, the capacitance measurement circuit 113 may be housed adjacent to or with the angular displacement unit 12 itself (as indicated with dashed arrow 130') or within, for example, one of the first and second rigid members (not shown) coupled to the angular displacement unit 12. It should be noted that the capacitance measurement circuit 113 can measure capacitance between the at least two electrodes of one of the compliant capacitors 32, 34. In another embodiment, the capacitance measurement circuit 113 can measure a differential capacitance of the two compliant capacitors 32, 34. When the angular displacement unit 12 includes the single compliant capacitor the capacitance measurement circuit 113 can measure a single capacitance between the electrodes of the single compliant capacitor. The capacitance measurement circuit 113 can measure the capacitance(s) or differential capacitance in terms of voltage or current. The capacitance measurement circuit 113 then transmits voltage data or current data to the micro-controller 115, such as to the calculation circuit 121, as indicated by arrow 132. The calculation circuit 121 calculates the values of the voltage data or current data provided by the capacitance measurement circuit 113 to calculate the angular displacement 60 between the first and second vectors 52, 54 (See FIG. 12A-12B). The calculation circuit 121 may then transmit angle data to the memory 122 (which then becomes logged data) and the control and analysis software 124, as indicated by respective arrows 134, 136. In one embodiment, parameters may be input as maximum/minimum limits for angular displacement through, for example, the user interface 118. The user interface 118 may include a display and/or a user input, such as input keys. The maximum limits (and minimum limits) may be useful for a user to know once the user has reached a particular angular displacement with the sensor system 10. As such, if the user does meet the desired parameters (or undesired as the case may be), the control and analysis software 124 may transmit a signal to the biofeedback amplifier 116, as indicated by arrow 138, which in turn may transmit a signal back to the biofeedback device 111, as indicated by arrow 140, at the sensor system 10.

The biofeedback device 111 may then produce a notification to the user that a predefined input parameter has been reached, such as the maximum angular displacement, so that the user understands in real-time the limits relative to the movement of the user's particular joint being analyzed, for example. The notification may be at least one of a visual notification, an audible notification, and a tactile notification or some other notification to facilitate the user's understanding of the user's maximum limit. Alternatively, the notification can be any combination of visual, audible and tactile notifications. The visual notification may be in the form of a blinking (or various colored) light or the like displayed on the sensor system 10 itself or the interface device 20 and/or also may be visualized on a display of the interface device 20. The audible notification may be a ring or beep or the like that may preferably be audibly transmitted from the interface device 20, but may also be transmitted from the sensor system 10. The tactile notification may be coupled to or integrated with one of the first and second rigid members 16, 18 (FIG. 12A) of the sensor system 10 or may be integrated in the interface device 20. Such tactile notification may be in the form of a vibration or some other tactile notification, such as a compression member. In this manner, the biofeedback device 111 may notify the user in real time upon extending or contracting ones anatomical joint at a maximum angular displacement according to a predetermined input parameter. Similarly, in another embodiment, a user may input parameters of a minimum angular displacement into the interface device 20 for biofeedback notification. Further, in another embodiment, the user may input parameters for both a minimum angular displacement and a maximum angular displacement. Inputting such parameters may be useful for exercises during physical therapy and for athletes training to obtain particular movements at various anatomical joints.

Upon completing a session of rehabilitation therapy or training or the like, for example, logged data 142 may be stored in the memory 122 or storage device of the interface device 20. Such logged data 142 may also be viewable on the interface device 20 on a display at the user interface 118. The logged data 142 may then be transferred to the remote device 22, as indicated by arrow 144. The remote device 22 may be any known computing device, such as a mobile device, smart phone, tablet, personal computer, gaming system, etc. In one embodiment, the logged data 142 may be transferred to a smart phone by, for example, wireless technology (e.g., over a wireless local area network (WLAN) such as a Bluetooth® network or Wi-Fi® network) or transferred via mini-USB ports or the like, as known to one of ordinary skill in the art. In another embodiment, the logged data 142 may be transferred to a personal computer via a port, such as a USB port with, for example, a portable memory device, such as a thumb drive. The user may then save the logged data 142 on the remote device 22 for further analysis. As previously set forth, the user may save several sessions of logged data 142 to the remote device 22 to obtain further analysis and comparison data to better understand, for example, progress or regress in the user's angular displacement of the user's anatomical joints.

Although not illustrated, the elements described in FIG. 14 may be powered by numerous power sources that include one or more of batteries, rechargeable batteries, wired power, capacitive storage, and power scavenging techniques such as radio frequency (RF) power scavenging, among others.

Figure 15:
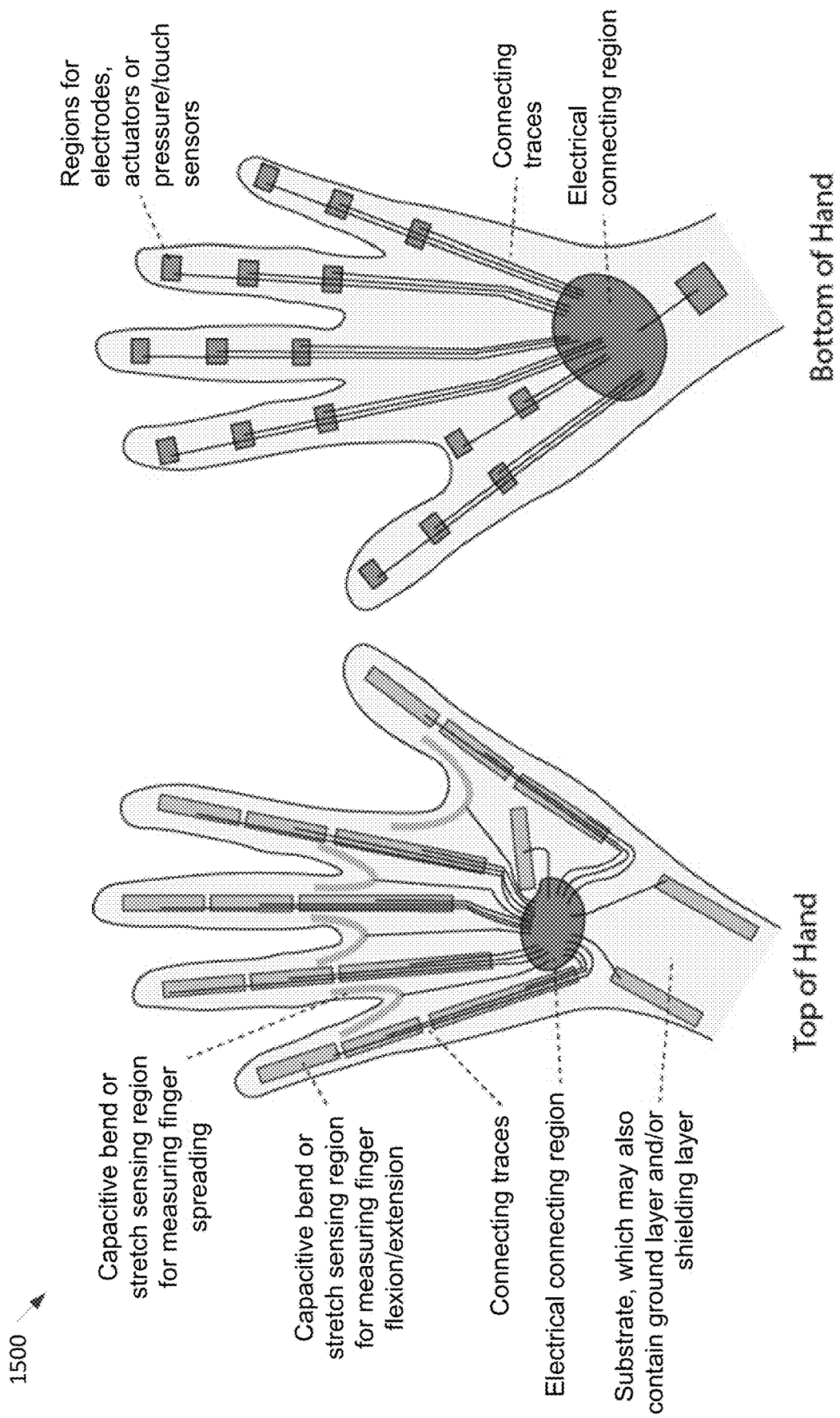
FIG. 15 illustrates a sensing network, in accordance with some embodiments.

FIG. 15 illustrates a sensing network, in accordance with some embodiments. Sensing network 1500, (also referred to as "multi-layer elastomeric capacitive sensing network" or "sense network") is shown to be overlaid on a human hand. Sensing network 1500 may be part of or included in a glove (not shown). It should be appreciated that sensing network 1500 may include one or more of the sensors and/or features described herein, such as multi-region angular displacement sensor (e.g., multi-region angular displacement sensor 200 of FIG. 2) and/or multi-region strain sensor (multi-region strain sensor 900 of FIG. 9).

Sensing network 1500, illustrated on the top of the hand, may be used to measure hand and finger motion. In one embodiment, the sensing network 1500 includes a multi-region strain sensor and/or multi-region angular displacement sensor and/or combination thereof overlaid on each finger. A multi-region angular displacement sensor and/or a multi-region strain sensor or may include one or more sense regions (e.g., sense region 201 of FIG. 2, sense region 901 of FIG. 9), each sense region including one or more sense elements. The multi-region angular displacement sensor and/or multi-region strain sensor may be placed on a multitude of compliant substrates, such as fabric, elastomer, or adhesive tape. Each sense region may measure a finger bending, stretching, and/or pressure of a finger on an object (e.g., touch) independent of another sense region. Each sense region may be spatially separated. The sense regions of the multi-region angular displacement sensor and/or multi-region strain sensor may be connected with conductive traces to an electrical connecting region. The conductive traces may be conductive elastomer traces. One or more of the multi-region angular displacement sensor and/or multi-region strain sensors may be connected to the electrical connecting region. The electrical connecting region may contain or connect to additional sensing electronics. Although one electrical connecting region is shown on the top of the hand, different embodiments may be used that include multiple electrical connecting regions.

The sensing network 1500 on the top of the hand may also include one or more sense elements, such as a compliant capacitor, in each area between the fingers to measure the movement of the hand at an area between the fingers (e.g., to measure finger spreading and contracting). The one or more sense elements in each area between the fingers may be coupled to the electrical connecting region with connecting traces as illustrated.

The sensing network 1500 on the top of the hand may also include additional sense elements to measured changes in wrist joint angles and/or thumb joint angles. Any number of sense elements may be used. The additional sense elements may also be connected to the electrical connecting region using conductive traces.

The sensing network 1500, illustrated on the bottom of the hand, may provide haptic feedback to a user. Haptic feedback may be a physical stimulation created by an electro-tactile device. Haptic feedback may be used to create a sense of touch for a user by applying forces, vibrations, heat, or motions to haptic sense elements of a multi-layer elastomeric sense network. Physical stimulation created using one or more haptic sense elements may be used to create tactile sensation in a virtual environment, to assist in the creation of virtual objects in a computer simulation, to control such virtual objects, and/or to enhance the remote control of machines and devices.

The sensing network 1500 on the bottom of the hand may include sensing regions of haptic sense elements, such as electrodes, actuators, and/or pressure sensors. Similar to the multi-region strain sensor and/or multi-region angular displacement sensor, a multi-region haptic sensor may have one or more sense regions (e.g., haptic sense region), each sense region including one or more haptic sense elements. A multi-region haptic sensor may, for example, have three sense regions capable of providing haptic feedback to a finger. The sense regions may be spatially separated and provide independent and varied tactile sensation with varying magnitudes to each sense region. A haptic sense element may be on a variety of compliant substrates, similar to a multi-region strain sensor and/or multi-region angular displacement sensor as described above. In one embodiment, a haptic sense element may be a compliant electrode that produces an amount of heat to simulate the touching of a hot object by a user. In another example, a haptic sense element may be an actuator that physically deforms. The haptic sense elements may be interspersed in different areas of the hand and connected by conductive traces that connect to the electrical connecting region, in a similar manner as described above with respect to the sensing network 1500 on the top of the hand. It should be appreciated that haptic sense elements may be interspersed or combined with other sense elements in any manner. It should also be appreciated that the sensing network 1500 measuring motion is shown on the top of the hand and the sensing network 1500 using haptic sense elements is shown on the bottom of the hand is used for purposes of illustration rather than limitation. A sensing network 1500 and/or multi-region strain/angular displacement/haptic sensor may use any combination of haptic sense elements and compliant sense elements to measure motion and/or provide haptic feedback.

Figure 16:
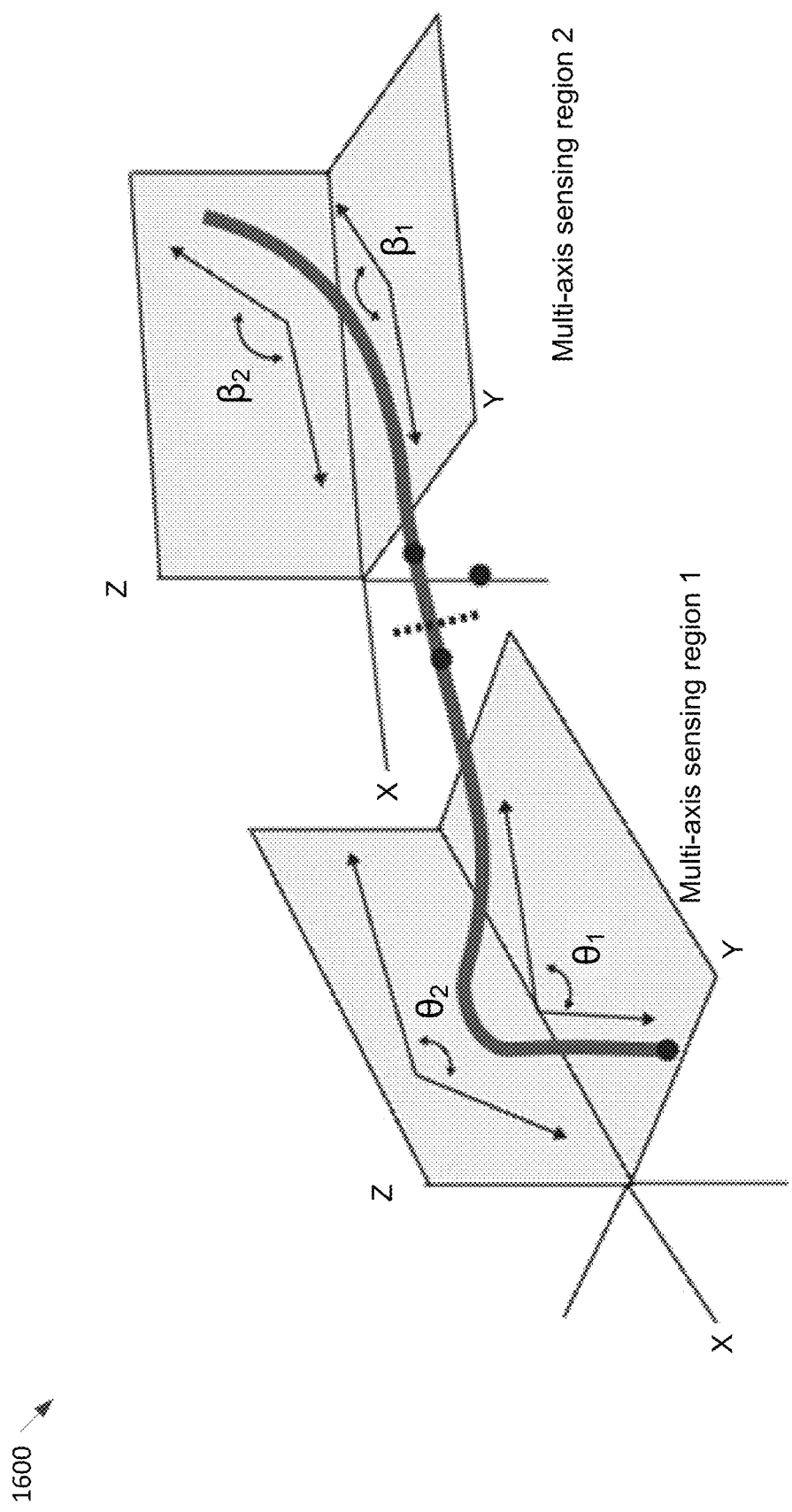
FIG. 16 illustrates a multi-axis multi-region angular displacement sensor, in accordance with some embodiments.

FIG. 16 illustrates a multi-axis multi-region angular displacement sensor, in accordance with some embodiments. A multi-axis multi-region angular displacement sensor 1600 may refer to a multi-region angular displacement sensor, as described herein, that has one or more sense regions that measures angular displacement about two axes (or about two perpendicular planes about an axis, such as a center axis). For example, referring to FIG. 1A-1B, connecting one or more additional sense elements in strand 112 perpendicular to sense element 114, angular displacement unit 100 may measure angular displacement in two orthogonal planes and any point within the two orthogonal planes. An exemplary electrode configuration of an angular displacement unit of a multi-axis multi-region angular displacement sensor 1600 is illustrated in FIG. 7C (See angular displacement unit 750H, 750I, 750J, and 750M). In reference to 750M of FIG. 7C, the first pair of compliant capacitors 771P and 771R (i.e., top and bottom) associated with angular displacement unit 750M are offset from and reflected about center axis 753M and center plane 784 and may be used to measure angular displacement about a first plane (e.g., center plane 785) than runs through the center axis 753 and bisects the compliant capacitors 771P and 771R. The second pair of compliant capacitor 771Q and 771S (i.e., right and left) are offset from and reflected about center axis 753 and center plane 785 and may be used to measure angular displacement about a second plane (e.g., center plane 784) that runs through the center axis 753M and bisects the second pair of compliant capacitors 771Q and 771S.

Multi-axis multi-region angular displacement sensor 1600 shows two sense regions (e.g., multi-axis sense region) where each region has two axes of angular displacement that are measured. Each region may include an angular displacement unit. The first region has vectors defined by endpoints (black dots, vector left out for clarity) of each angular displacement unit or sense region, which have a projection onto the x-y plane, from which the first angular displacement angle θ1 is computed, and have a projection onto the x-z plane from which the second angular displacement angle θ2 is computed. The first angular displacement angle θ1 and the second angular displacement angle θ2 are orthogonal to each other. A similar diagram is shown on the right, where the second sense region also has two angular displacement angles, β1 and β2. The dashed line in the center represents the boundary between two sense regions and illustrates that the angular displacements of the first sense region are independent from the angular displacements of the second sense region.

Figure 17:
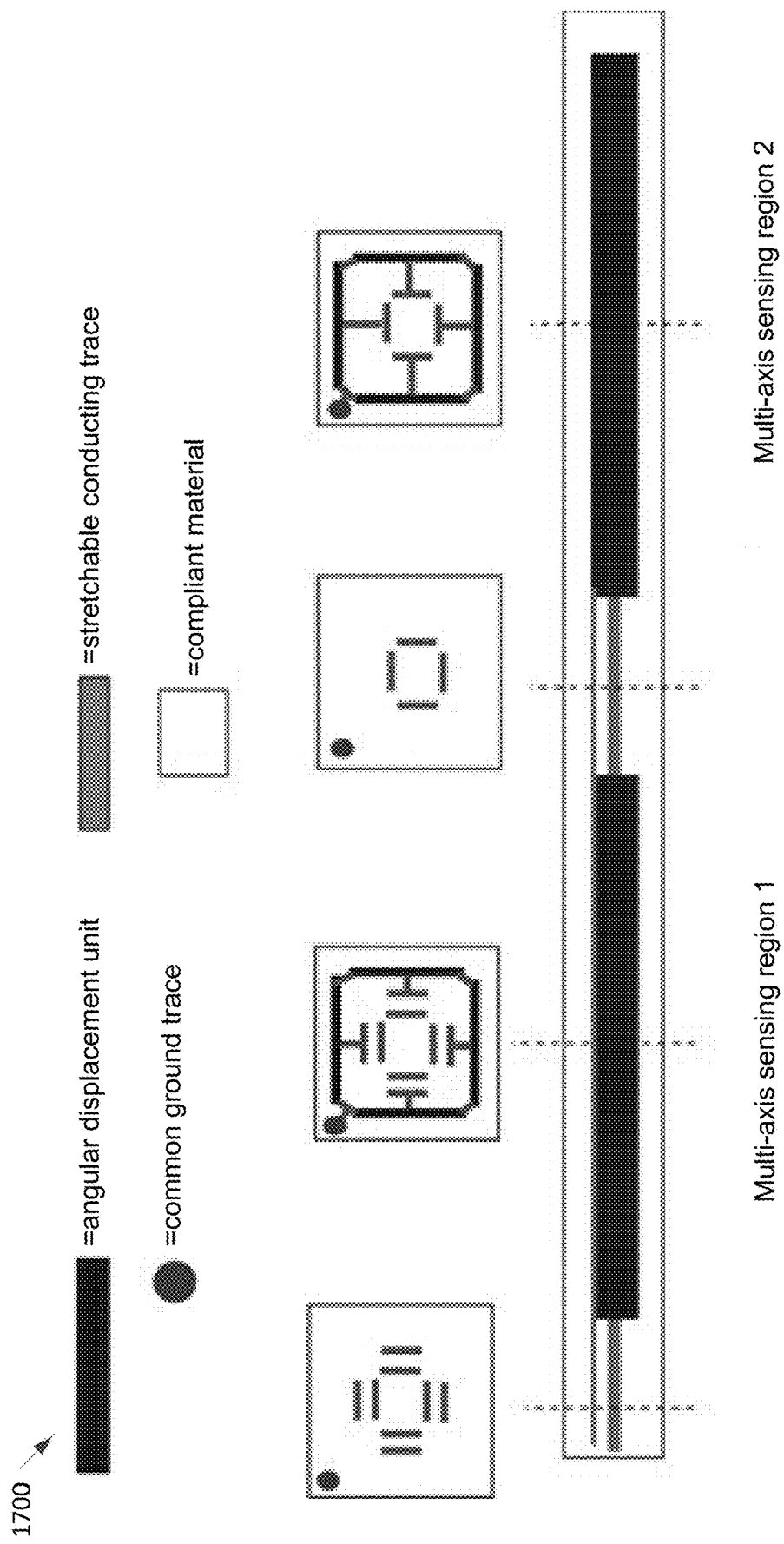
FIG. 17 illustrates a multi-axis multi-region angular displacement sensor, in accordance with some embodiments.

FIG. 17 illustrates a multi-axis multi-region angular displacement sensor, in accordance with some embodiments. Multi-axis multi-region angular displacement sensor 1700 illustrates two sense regions. It should be appreciated that multi-axis multi-region angular displacement sensor 1700 may have any number of sense regions. A side view (bottom) is shown where the angular displacement units (black rectangles) are embedded within or on top of the strand (white inside rectangle). Stretchable electrically conductive traces that connect the angular displacement units to a measuring circuit (not shown) are dark gray. The thin conductive trace is for the common ground and the thick conductive trace represents all the traces to each angular displacement unit. Dotted lines are connected to cross section views of the associated part of multi-axis multi-region angular displacement sensor 1700. Within the cross section views, black lines represent angular displacement units, dark gray circles represent the common ground trace, while a dark gray line indicates a trace for each angular displacement unit. A legend is shown on the top.

In one embodiment, multi-axis multi-region angular displacement sensor 1700 includes a strand or an elongated member made of compliant material with multiple sense regions. Each sense region includes an angular displacement unit with two pairs of compliant capacitors. The first pair of compliant capacitors is oriented in a coplanar manner and offset from and reflected about a center axis and the center plane. The first pair of compliant capacitors is read via a differential capacitance measurement circuit in order to provide a measure of angular displacement within the plane perpendicular to the center plane. The second pair of compliant capacitors is orthogonal to the first pair of compliant capacitors and measures the angular displacement in the orthogonal plane when connected to a similar differential capacitive circuit. Angular displacement units (and the compliant capacitor therein) are electrically connected to the connecting region using traces located on the interior of the strand. The dielectric elastomer is a thermoset silicone elastomer with a durometer of 10A-60A. The conductive elastomer is a thermoset silicone elastomer with a durometer of 10A-60A with conductive micro or nano particles (e.g. carbon black or carbon nanotubes) dispersed within. Multi-axis multi-region angular displacement sensor 1700 may measure two angular displacements for each sense region.

Figure 18:
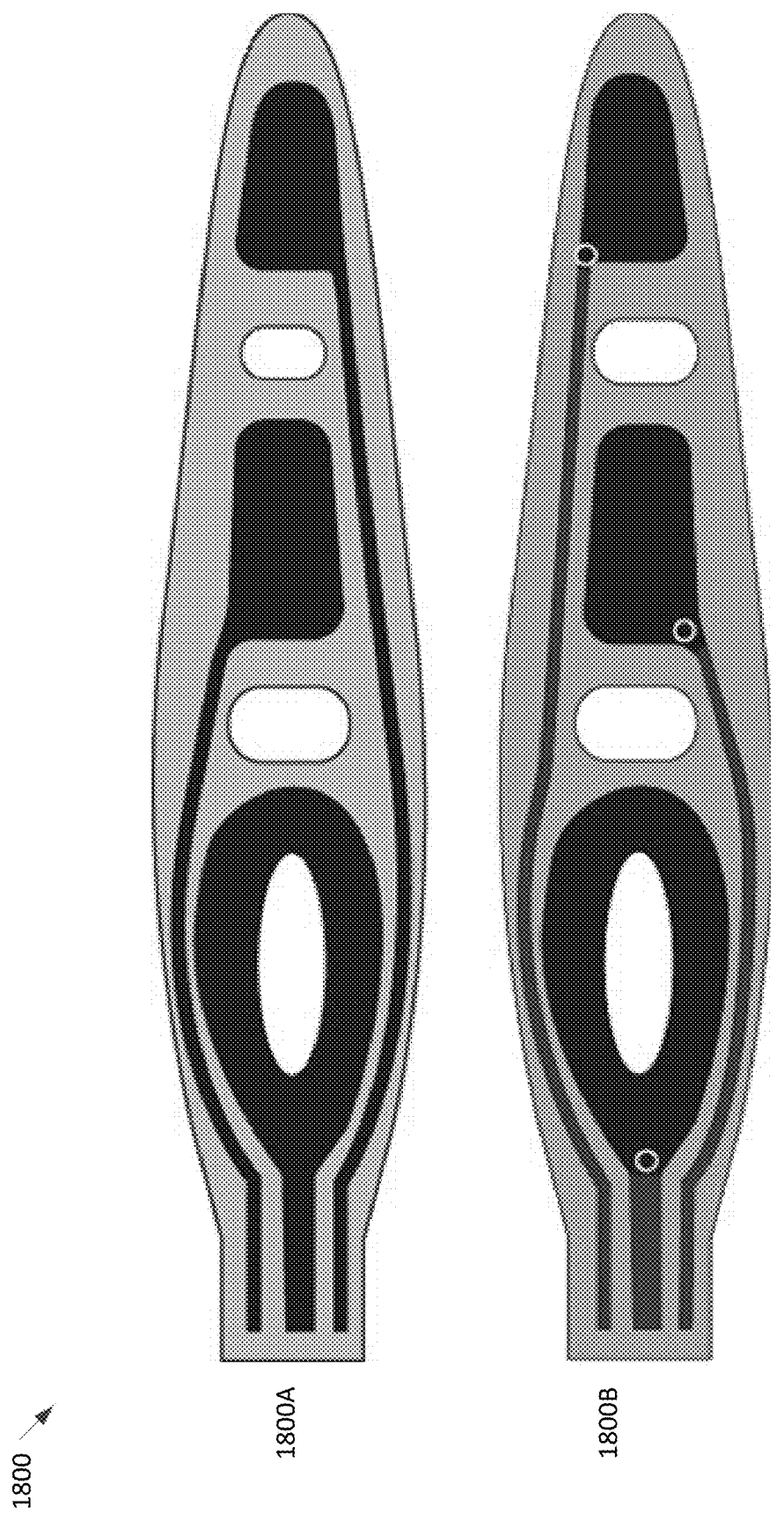
FIG. 18 illustrates a multi-region angular displacement sensor, in accordance with some embodiments

FIG. 18 illustrates a multi-region angular displacement sensor, in accordance with some embodiments. Multi-region angular displacement sensors 1800 illustrate may measure finger angle flexion/extension. Multi-region angular displacement sensors 1800 show a strand of compliant material in dark gray, angular displacement unit in black and cut out openings in white. Multi-region angular displacement sensor 1800A shows traces that are made on the same layer as the electrodes of the compliant capacitor of the angular displacement unit and are directly patterned and electrically connected. Multi-region angular displacement sensor 1800B shows traces that are added to a different layer or plane than the electrodes of the compliant capacitors of the angular displacement unit. The traces are connected to the electrodes using conductive vias. The cutout on the left helps center the sensor over the knuckle, while the other two cutouts increase the compliance between sensing regions.

Figure 19:
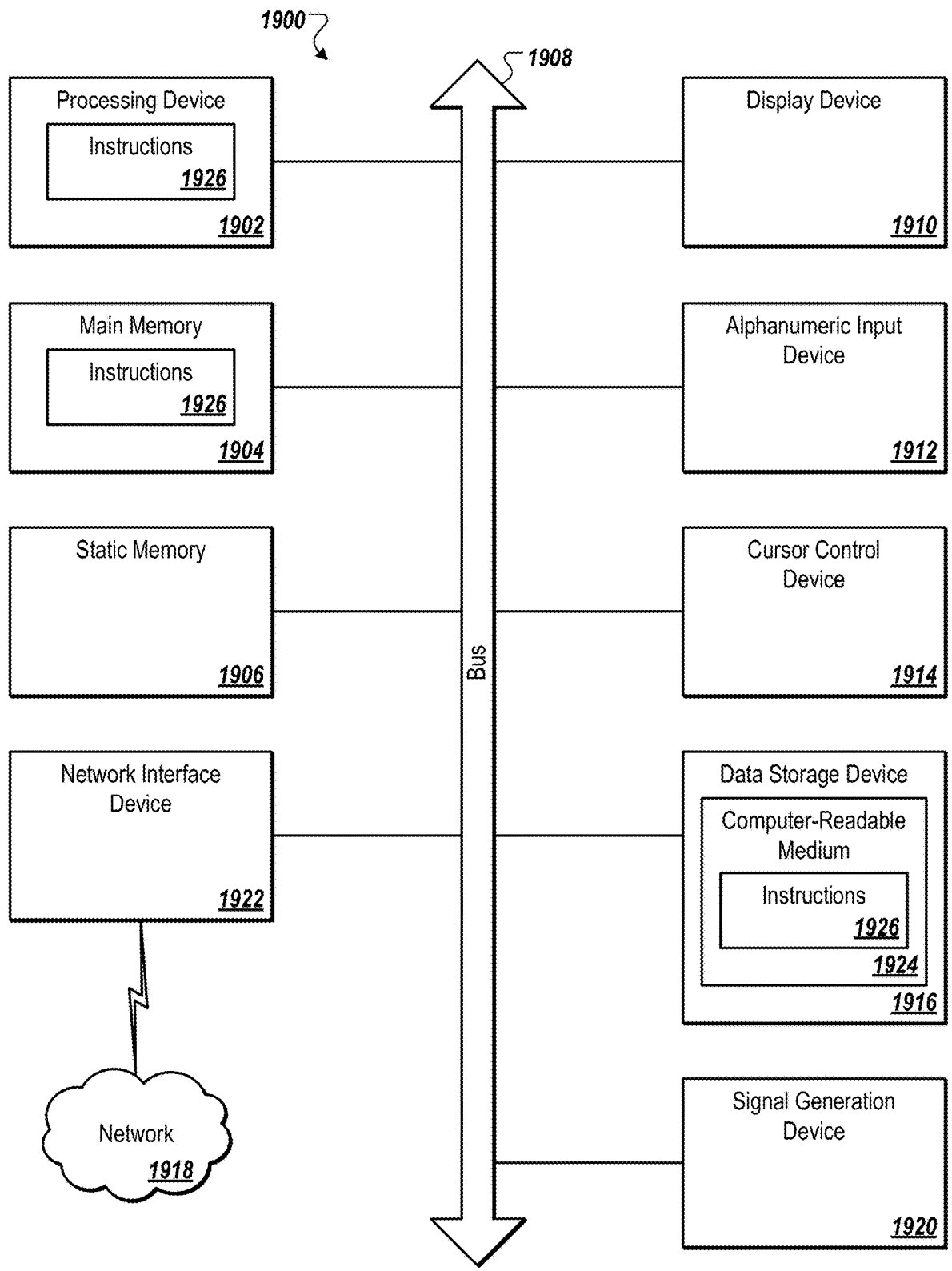
FIG. 19 illustrates a diagrammatic representation of a machine in the example form of a computer system, in accordance with some embodiments.

FIG. 19 illustrates a diagrammatic representation of a machine in the example form of a computer system, in accordance with some embodiments. The computer system 1900 may access a set of instructions that when executed cause the machine to perform any one or more of the methodologies discussed herein. The computer system 1900 may correspond to the interface device 20, remote device 22, or micro-controller 115 that executes the control and analysis software 124 of FIG. 14. The computer system 1900 may correspond to an IMU or a computer system in communication with an IMU, as described herein. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computer system 1900 includes a processing device 1902, a main memory 1904 (e.g., read-only memory (ROM), flash memory, dynamic random access memory (DRAM) such as synchronous DRAM (SDRAM), a static memory 1906 (e.g., flash memory, static random access memory (SRAM), etc.), and a secondary memory 1916 (e.g., a data storage device), which communicate with each other via a bus 1908.

The processing device 1902 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a microcontroller, a single core CPU, a multi-core CPU and a massively multi-core system that includes many interconnected integrated circuits, each of which may include multiple processor cores. The processing device 1902 may therefore include multiple processors. The processing device 1902 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 1902 may also be one or more special-purpose processing devices such as an application specific integrated circuit (ASIC), a field programmable gate array (FPGA), a digital signal processor (DSP), network processor, or the like.

The computer system 1900 may further include one or more network interface devices 1922 (e.g., NICs). The computer system 1900 also may include a video display unit 1910 (e.g., a liquid crystal display (LCD) or a cathode ray tube (CRT)), an alphanumeric input device 1912 (e.g., a keyboard), a cursor control device 1914 (e.g., a mouse), and a signal generation device 1920 (e.g., a speaker).

The secondary memory 1916 may include a machine-readable storage medium (or more specifically a computer-readable storage medium) 1924 on which is stored one or more sets of instructions 1954 embodying any one or more of the methodologies or functions described herein. The instructions 1954 may also reside, completely or at least partially, within the main memory 1904 and/or within the processing device 1902 during execution thereof by the computer system 1900; the main memory 1904 and the processing device 1902 also constituting machine-readable storage media.

While the computer-readable storage medium 1924 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies of the present embodiments. The term "computer-readable storage medium" shall accordingly be taken to include, but not be limited to, non-transitory media such as solid-state memories, and optical and magnetic media.

The modules, components and other features described herein can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying", "measuring", "establishing", "detecting", "modifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present disclosure also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present embodiments are not described with reference to any particular programming language. It will be appreciated that a variety of programming languages may be used to implement the teachings of the embodiments as described herein.

It is to be understood that the above description is intended to be illustrative, and not restrictive. Many other embodiments will be apparent to those of skill in the art upon reading and understanding the above description. Although the present embodiments has been described with reference to specific examples, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

In the previous description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the embodiments of the present disclosure.

Figure 20A:
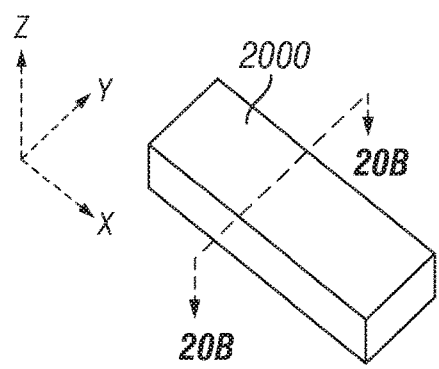
FIGS. 20A-B illustrate a compliant capacitive angular displacement sensor, according to embodiments.
Figure 20B:
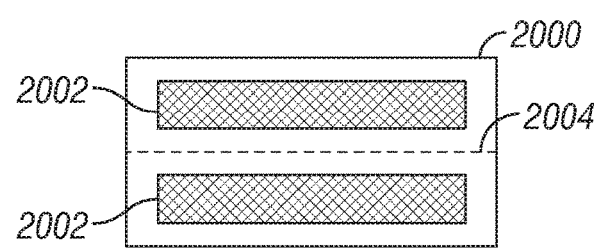
Figure 21A:
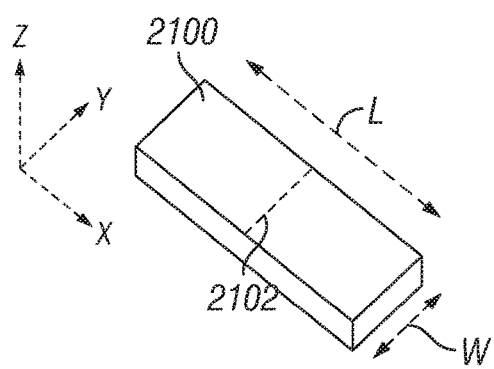
FIGS. 21A-B illustrate multiple reference axes of a compliant capacitive angular displacement sensor, according to embodiments.
Figure 21B:
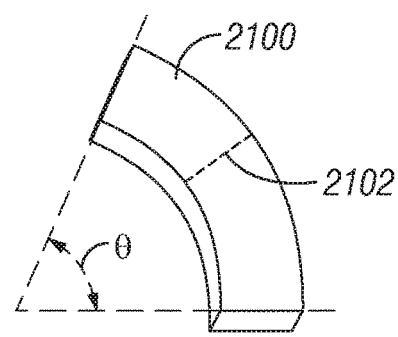
Figure 22A:
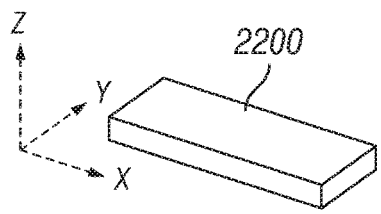
FIGS. 22A-C illustrate multiple bending states of a compliant capacitive angular displacement sensor, according to embodiments.
Figure 22B:
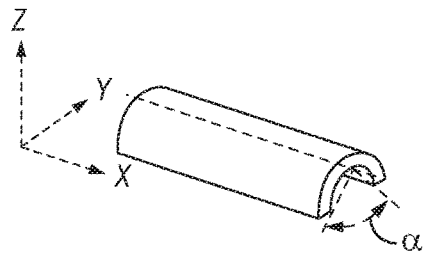
Figure 22C:
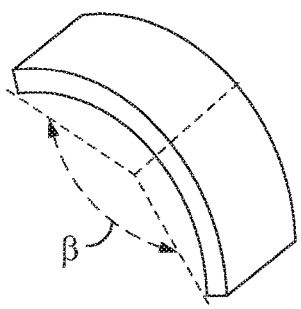

FIGS. 20A-B illustrate a compliant capacitive angular displacement sensor 2000, according to embodiments. In embodiments, compliant, capacitive angular displacement sensors 2000 (also referred to as bend sensors) with one or more angular displacement units may have an elongated axis along the direction of the X axis as shown, with a width along the Y axis and a thickness along the Z axis. FIG. 20B shows a cross sectional view of such a sensor 2000 and reveals at least one compliant capacitor 2002 offset from the center bending axis 2004, and may have two or more compliant capacitors 2002 offset from the center axis 2004 as shown in FIG. 20B. The capacitance of each compliant capacitor 2002 changes in proportion to the amount of angular displacement, or bend applied to the sensor 2000. FIGS. 21A-B illustrate a multiple reference axes of a compliant capacitive angular displacement sensor 2100, according to embodiments. In embodiments, the width (W, along the Y axis) is much less than the length (L, along the X axis) such that bending about only a single axis is possible, where the bending axis 2102 is defined as a line perpendicular to the long or X axis and parallel to the short or Y axis (center line or bending axis 2102). In the aforementioned embodiment, the sensor output is proportional to bending along this single axis 2102 and the angular displacement $\Theta$ is defined by bending about the center line or bending axis 2102 as shown in FIG. 21B. FIGS. 22A-C illustrate multiple bending states of a compliant capacitive angular displacement sensor 2200, according to embodiments. In other embodiments, for compliant angular displacement sensors with a width that is comparable to the length, bending may occur both about the center line (referred to henceforth as the y-axis) as well as a center line perpendicular to the short axis, which will be referred to as the x-axis. For example, for a single channel sensor (e.g., single angular displacement unit), bending about the x-axis or y-axis will produce similar signals that may be difficult to disambiguate. Bending about both axes may occur as illustrated in FIGS. 22B-C. FIG. 22A illustrates a compliant, capacitive bending sensor 2200 in an unbent, or reference state. FIG. 22B illustrates bending by an angle $\alpha$ about the x-axis and FIG. 22C illustrates bending by an angle $\beta$ about the y-axis. The sensor 2200 could also be bent simultaneously about the x-axis and y-axis. For a single channel sensor 2200, the change in capacitance (single sided sensor) or the change in differential capacitance (two sided sensor) is related to the total curvature of the sensor 2200 about both the x-axis and the y-axis, and thus does not distinguish between bending along the x-axis or y-axis.

Figure 23A:
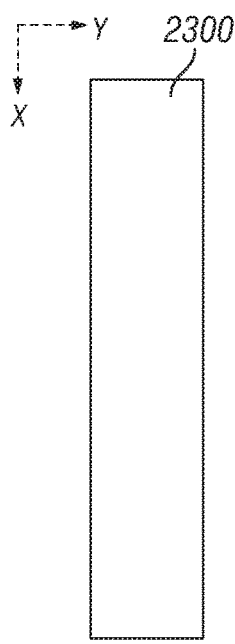
FIGS. 23A-C illustrate top-down views of embodiments of a compliant capacitive angular displacement sensor with reinforcement structures.
Figure 23B:
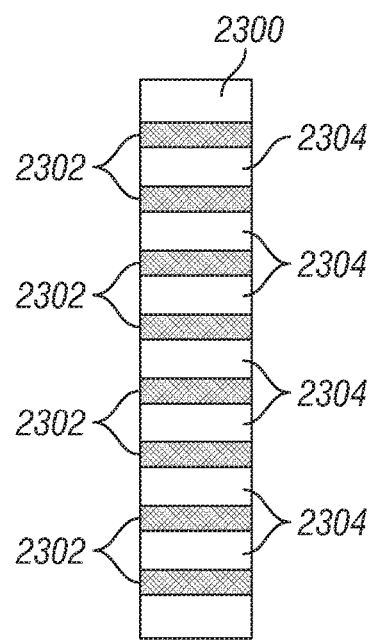
Figure 23C:
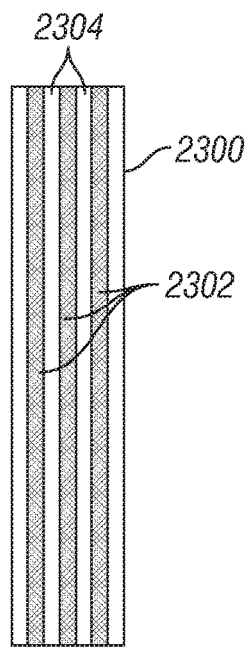
Figure 24A:
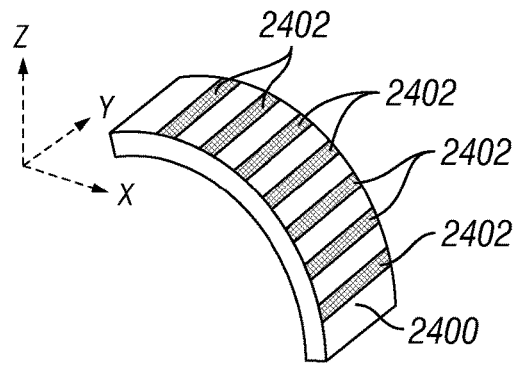
FIGS. 24A-B illustrate bending of a compliant capacitive angular displacement sensor with reinforcement structures, according to embodiments.
Figure 24B:
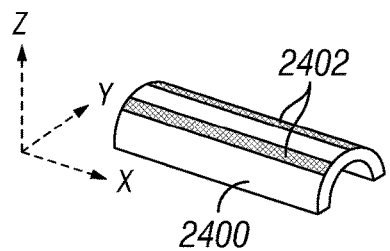

FIGS. 23A-C illustrate top-down views of a compliant capacitive angular displacement sensor 2300 with reinforcement structures 2302, according to embodiments. In embodiments, reinforcement structures 2302 may be added, separated by a nonzero space 2304, to the compliant bend sensor 2300 such that bending about one or more axes is restricted. In embodiments, the reinforcement structures 2302 act to make the bending stiffness anisotropic, meaning that the bending stiffness about one axis is higher than the other axis. In some embodiments, where the reinforcement structures 2302 are aligned, the anisotropy is called transverse isotropy, with an axis of isotropy aligned with the reinforcement structures 2302. An example of reinforcement structures 2302 on the surface of a complaint bend sensor 2300 is illustrated in FIGS. 23B-C, which shows reinforcement structures that are aligned with either the y-axis (FIG. 23B) (making the structure have a transverse isotropy along the y-axis) or along the x-axis (FIG. 23C) (making the structure have a transverse isotropy along the x-axis) and FIG. 23A shows a compliant bend sensor 2300 without reinforcement structures 2302. FIGS. 24A-B illustrate bending of a compliant capacitive angular displacement sensor 2400 with reinforcement structures 2402, according to embodiments. In embodiments, where the reinforcement structures 2402 are sufficiently stiff, these structures 2402 will allow the angular displacement sensor 2400 to bend substantially about the axis of transverse isotropy, but not along the other axis. For example, FIG. 24A illustrates an embodiment of a compliant capacitive angular displacement sensor 2400 that allows bending about the y-axis and FIG. 24B illustrates a compliant capacitive angular displacement sensor 2400 that allows bending about the bending about the x-axis.

Figure 25A:
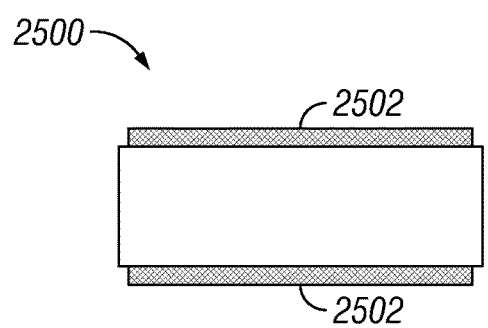
FIGS. 25A-D illustrate embodiments of a compliant capacitive angular displacement sensor with multiple configurations of reinforcement structures.
Figure 25B:
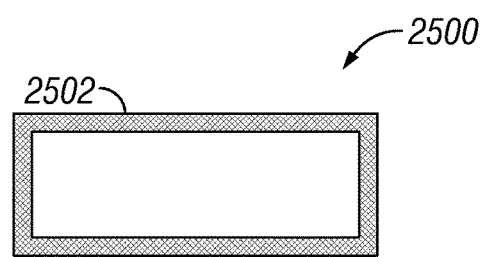
Figure 25C:
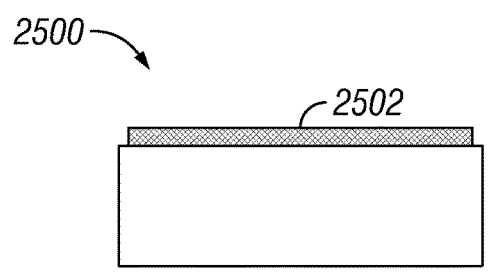
Figure 25D:
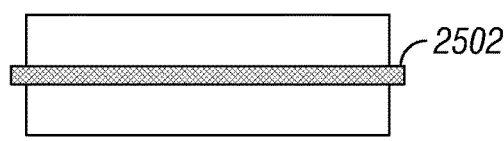

FIGS. 25A-D illustrate a compliant capacitive angular displacement sensor 2500 with multiple configurations of reinforcement structures 2502, according to embodiments. In embodiments, shown in FIG. 25A, reinforcement structures 2502 may be placed on both the top and bottom of the sensor 2500. In other embodiments, shown in FIG. 25B, reinforcement structures 2502 may take the form of discreetly spaced rings around the sensor 2500. In embodiments, shown in FIG. 25C, reinforcement structures 2502 may be on a single side of the sensor 2500 or, as shown in FIG. 25D, may be in the middle of the center (e.g. along the center line and between the two compliant capacitors in sensors with such a configuration) or offset from the middle. In embodiments, the reinforcement structures may be made of any material stiffer than the sensor material, such as plastic, reinforced plastic composites, metal, metal composites or other materials.

Figure 26A:
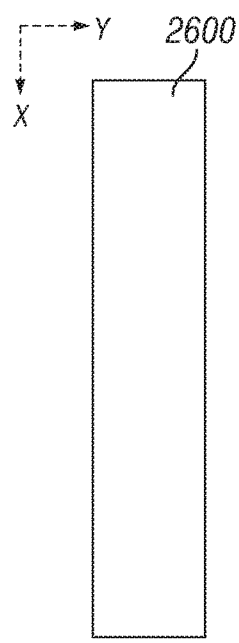
FIGS. 26A-C illustrate embodiments of a compliant capacitive angular displacement sensor with additional configurations of reinforcement structures.
Figure 26B:
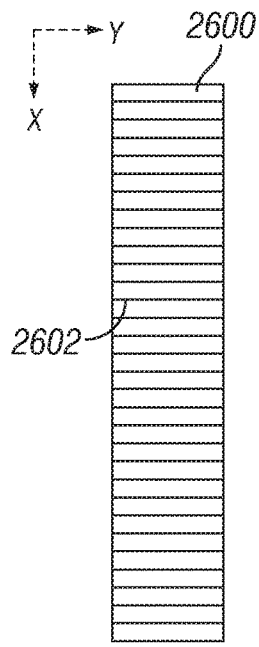
Figure 26C:
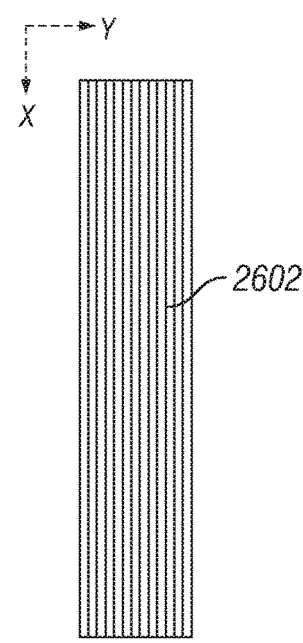

FIGS. 26A-C illustrate embodiments of a compliant capacitive angular displacement sensor 2600 with additional configurations of reinforcement structures 2602. In embodiments, as shown in FIGS. 26B-C, the reinforcement structures 2602 may be created by embedded aligned fibers with a stiffness greater than the sensor 2600 either within or on the surface of the sensor 2600 such that a transverse isotropy is created. For example, a unidirectional fiber sheet may be attached via an adhesive or other means to the top and bottom of a sensor so as to create a sensor that bends in a single direction. In embodiments, the fibers may be common textile fibers (e.g. nylon or cotton), fibers used in composites (e.g. carbon fiber, fiberglass or aramid) or any other type of fiber material. In other embodiments, other ways of creating transverse isotropy could be used, such as having distributions of highly aligned (but not perfectly aligned) shorter fibers, such as chopped carbon fiber or carbon nanofibers. Such reinforcements structures may apply to the entire area of the sensor 2600, or may cover just certain portions of the sensor 2600. FIG. 26A shows a sensor 2600 without any reinforcement structures 2602. FIG. 26B shows a sensor 2600 with transverse isotropy aligned with the x-axis induced by fibers 2602 pointing in the y-axis direction and FIG. 26C shows a sensor with transverse isotropy aligned with the y-axis induced by fibers 2602 pointing in the x-axis direction.

Figure 27A:
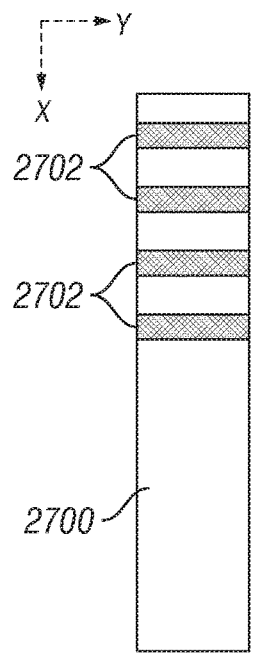
FIGS. 27A-C illustrate embodiments of a compliant capacitive angular displacement sensor with reinforcement structures covering a portion of the angular displacement sensor.
Figure 27B:
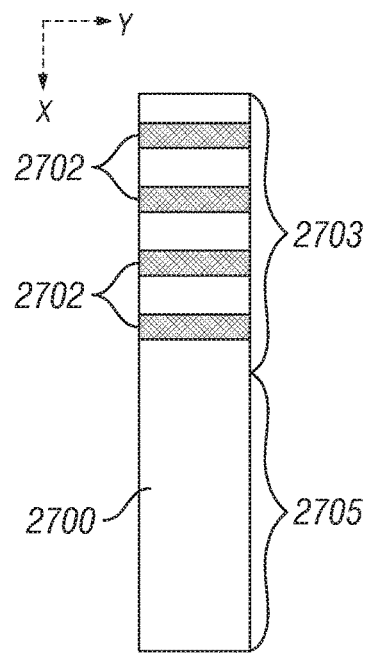
Figure 27C:
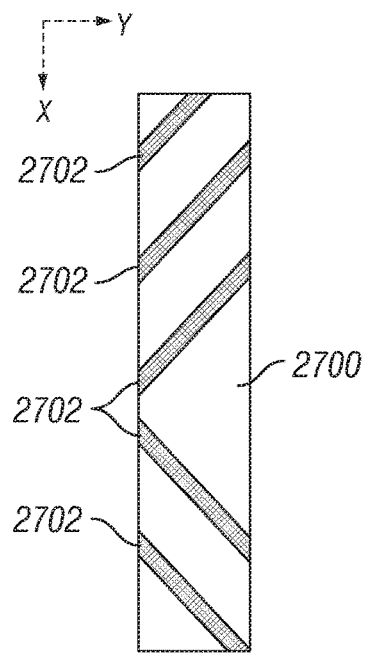

FIGS. 27A-C illustrate embodiments of a compliant capacitive angular displacement sensor 2700 with reinforcement structures 2702 covering a portion of the angular displacement sensor 2700. In embodiments, such as those shown in FIGS. 27A-B, multi-region angular displacement sensors 2700 may have some sensing regions (e.g., region 2703) with reinforcement structures 2702, while others regions (e.g., 2705) do not have reinforcement structures 2702. In embodiments, such as those shown in FIGS. 27A-B, reinforcement structures 2702 may be aligned along any axis (e.g., y-axis in FIGS. 27A-B) of the sensor 2700, or may take on shapes other than straight lines (e.g., as shown in FIG. 27C) if types of anisotropy other than transverse anisotropy are desired.

FIGS. 28A-C illustrate embodiments of a compliant capacitive angular displacement sensor 2800 with reinforcement structures 2802 of different shapes, according to embodiments. In some embodiments, reinforcement structures 2802 may be curved, such as those shown in FIG. 28A, concentric closed curves, such as those shown in FIG. 28B, or dots, such as those shown in FIG. 28C, for example. Although such reinforcements 2802 have been discussed only in the context of compliant angular displacement sensors 2800, it is understood that they may also be applied to other compliant stretch sensors and pressure sensors. Furthermore, forms of anisotropy other than transverse may also be created.

Figure 29:
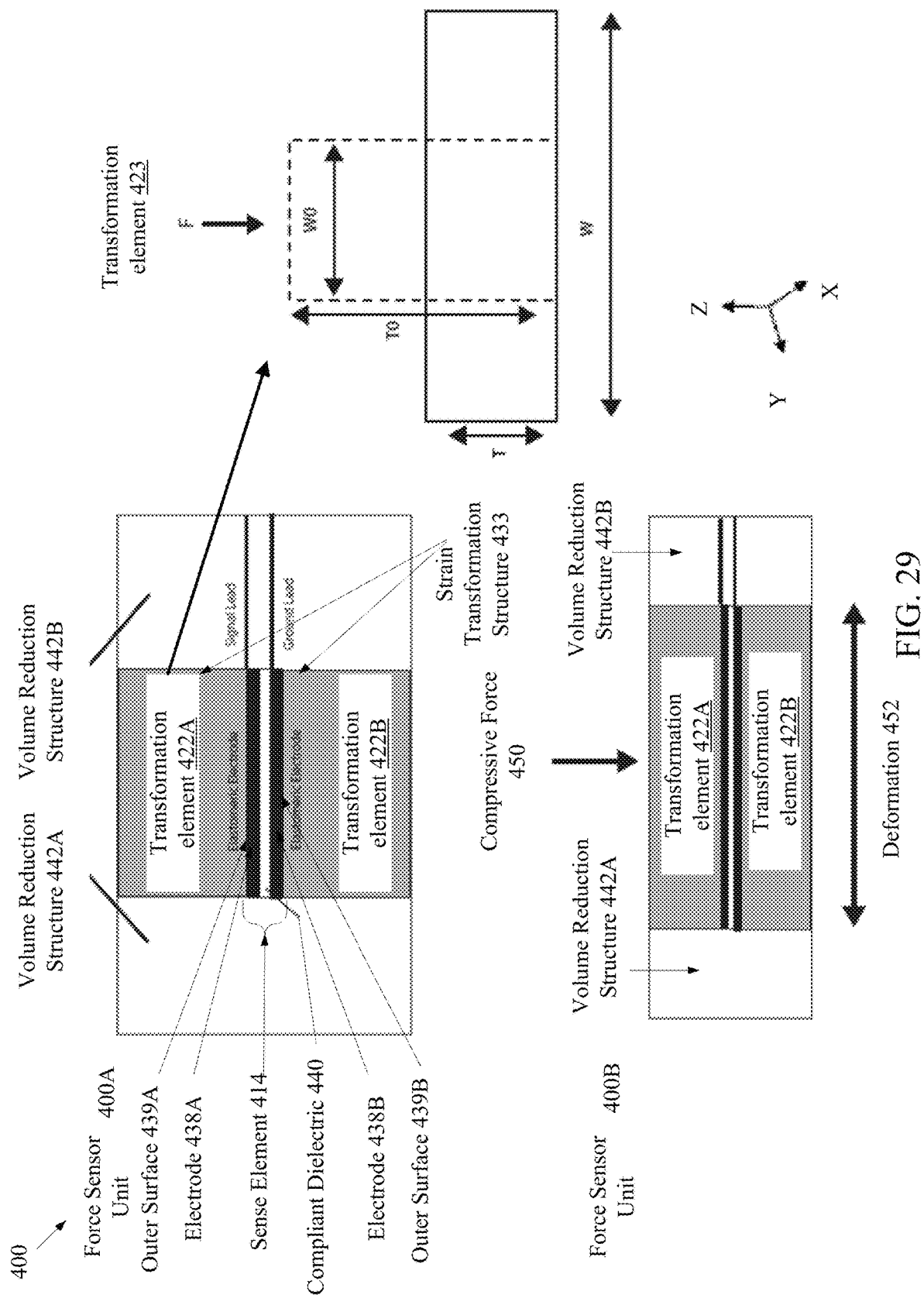
FIG. 29 is an illustration of a force sensor unit, in accordance with some embodiments.

FIG. 29 is an illustration of a force sensor unit 400, in accordance with some embodiments. In embodiments, a force sensor unit 400 may translate a received compressive force 450 into a substantially linear change in capacitance of the sense element 414. It may be noted that features of strain unit 920 as described with respect to FIG. 9, may be further applied in describing force sensor unit 400. For example, strain unit 920 is described as having a proportional or substantially linear change in capacitance responsive to tensile strain. In embodiments, capacitance of a sense element 414, such as a parallel plate compliant capacitor, of strain unit 920 is a linear function of area of the compliant capacitor.

In embodiments, compressive force 450 perpendicular to the X-Y plane may be applied to the strain transformation structure 433. The compressive force 450 may induce a deformation of a surface of strain transformation structure 433 (e.g., area of the bottom surface of transformation element 422A) parallel the X-Y plane. For example the bottom surface of transformation element 422A may deform axially (e.g., along the Y-direction) or bi-axially (e.g., along the X and Y direction). In embodiments, the deformation of strain transformation structure 433 may be substantially linear to the compressive force 450. The deformation of the surface of strain transformation structure 433 (e.g., surfaces coupled to the sense element 414) induces a substantially linear change in the area of sense element 414. In embodiments, the change in area of the sense element induces a change in area of one or more of the electrodes of the sense element 414. In other embodiments, the change in area of the sense element also induces a decrease in thickness or distance between the electrodes of sense element 414. In instances where the sense element 414 is a parallel plate compliant capacitor, the substantially linear change in area of sense element 414 may induce a substantially linear change in capacitance in the sense element 414. In embodiments, the capacitance of sense element 414 may be indicative to the applied compressive force 450 on strain transformation structure 433. In embodiments, the strain transformation structure 433 may convert a compressive force 450 to an axial or biaxial strain within sense element 414. The compressive force 450 is converted to a measurable and substantially linear change in capacitance. In embodiments, strains along the Z-axis of the strain transformation structure in response to force would be within 0-50%, with 0-20% being ideal. The force will induce strains in the X and Y-axis of 0-40% strain. In one embodiment the range of strain is within 0-10%.

In embodiments, force sensor unit 400A shows force sensor unit 400 under no or negligible compressive force 450 (e.g., load). Force sensor unit 400B shows force sensor unit 400 under compressive force 450. In embodiments, the compressive force 450 may be perpendicular to the X-Y plane. For purposes of illustration, the X-Y plane may be orthogonal to the page illustrating FIG. 29 and bisect the page. In embodiments, sense element 414 may be orientated parallel to the X-Y plane, where each layer (electrode 438A, dielectric 440, and electrode 438B) is also orientated parallel to the X-Y plane.

In embodiments, sense element 414 is a compliant capacitor. Sense element 414 may include electrode 438A and electrode 438B. A dielectric 440 may be disposed between electrodes 438 in the X-Y plane. In other embodiments, sense element 414 may include more than two electrodes 438. For example, another electrode (not shown) may be disposed between electrode 438A and 438B, where the other electrode is disposed parallel to the X-Y plane. In embodiments, one or more outer electrode 438 (in a two electrode or greater configuration) may be coupled to a ground voltage potential using leads, for example. In embodiments, electrodes 438 and dielectric 440 are a compliant material, such as an elastomeric. In embodiments, the sense element 414 may deform in any direction in the X-Y plane and maintain connectivity and conductivity.

In embodiments, the force sensor unit 400 includes at least one strain transformation structure 433. In embodiments, a strain transformation structure 433 may include one or more transformation elements 422. As illustrated, strain transformation structure 433 includes transformation element 422A and 422B above and below sense element 414, respectively. Transformation element 422A may be coupled to the outer surface 439A of electrode 438A in a manner that a deformation of the bottom surface of transformation element 422A induces a similar deformation of electrode 438A. Transformation element 422B may be coupled to the outer surface 439B of electrode 438B in a manner that a deformation of the bottom surface of transformation element 422B induces a similar deformation of electrode 438B. Transformation elements 422 may be coupled directly or in some other manner to respective transformation elements 422. As noted above the transformation elements 422 may deform axially or bi-axially. In some embodiments, transformation element 422 may constrained so as to be prevented to deform along at least one axis (e.g., X-axis), but allowed to deform along another axis (e.g., Y-axis). In some embodiments, transformation element 422A and 422B of strain transformation structure 433 may be the same material or different materials.

In embodiments, strain transformation structure 433 may be at least partially surrounded by volume reduction structure 442. As illustrated, in one embodiment, volume reduction structure 442 may surround the sides of strain transformation structure 433. In embodiments, volume reduction structure 442 may be a compressible material, such as open cell foam, closed cell foam or a fluid or gas allowed to flow outside the volume reduction structure 442. In embodiments, volume reduction structure 442 may be made from a material that is more compressible than a material used for transformation elements 422. In embodiments, volume reduction structure 442 may reduce in volume to allow the strain transformation structure 433 to deform responsive to compressive force 450. As illustrated in force sensor unit 400b, volume reduction structure 442 illustrates a decrease in volume responsive to the deformation of strain transformation structure 433.

In embodiments, transformation elements 422 are further illustrated by transformation element 423. Force (F) may represent an applied force, such as compressive force 450, applied to transformation element 423. Transformation element 423 may be a certain shape, such as a rectangular shape, a cylindrical shape, or any other geometric or non-geometric shape. In embodiments, transformation element 423 may be an incompressible material, such as an incompressible elastomeric material (e.g., silicones). In embodiments, an incompressible material may be deformed and remain of substantially the same volume. In some embodiments, a substantially incompressible material has a Poisson's ratio very close to 0.5 (perfectly incompressible), and within the range of 0.4-0.5 in real materials. In embodiments, responsive to force (F), transformation element 423 may induce a lateral deformation or expansion. For example, the dotted line may represent an non-deformed transformation element 423 having a reference width (W0) and reference thickness (T0). As force (F) is applied, a new thickness (T) and width (W) is induced. It may be appreciated that Force (F) may induce a lateral deformation (W) (axial deformation) in two-dimensional space and/or similar depth deformation into direction of the page in three-dimensional space.

In embodiments, incompressible materials may deform in a linear or substantially linear manner. The deformation of transformation element 423 responsive to force on a rectangular piece of material with a given surface area may be illustrated by Equation 1.

$$\alpha=(1-F*K) \quad [\text{Eq. 1}]$$

"F" is the applied force. "K" is the stiffness of the material, which may be a function of area and compressive modulus. "α" is the compression ratio, which is less than 1 form compressive deformation and is related to engineering strain (e) by Equation 2.

$$\alpha=(1+e) \quad [\text{Eq. 2}]$$

"e" is negative for compression. For an incompressible material, such as an incompressible elastomer, the resulting deformation perpendicular to the applied force (F) may be identical in both directions and may described by Equation 3.

$$\lambda=1/\sqrt{\alpha} \quad [\text{Eq. 3}]$$

"λ" is the resulting deformation, such as stretch in the X-Y plane that results from compression a in the z direction. The thickness (T), width (W), and surface area (A) is described by Equations 4-6. Surface area (A) may be the bottom and/or top (e.g. perpendicular surface to compressive force 450) of transformation element 423 (assuming that the deformation is constant through the thickness).

$$T = T0\alpha \quad [\text{Eq. 4}]$$

$$W = W0\lambda \quad [\text{Eq. 5}]$$

$$A = W0^2\lambda^2 \quad [\text{Eq. 6}]$$

Capacitance (C) may be described by Equation 7.

$$C=\varepsilon A/T \quad [\text{Eq. 7}]$$

"ε" is the permittivity of the material. Assuming that a compliant capacitor is embedded in the transformation element 423, the capacitance induced by a deformation of transformation element 423 where the deformation is induced by the applied force (F) may be expressed in Equation 8.

$$C = (\varepsilon W0^2/T0)(\alpha)^{-2} \qquad [\text{Eq. 8}]$$

It may be noted that Equation 8 is nonlinear, but for small values of the compression ratio "α", a substantially linear relationship may be achieved. For example, for a compression ratio of 95%, the capacitance error is approximately 1.3%, for a compression ratio of 90%, the capacitance error (e.g., the deviation of capacitance from a linear model of percent capacitance change to compression ratio) is approximately 2.7%, for a compression ratio of 85%, the capacitance error is approximately 4.3%, for a compression ratio of 80%, the capacitance error is approximately 6%, and for a compression ratio of 70%, the capacitance error is approximately 10%.

In embodiments, the compression ratio of transformation element 423 may be chosen to meet a particular application's requirements. In some embodiments, a compression ratio of 90% or greater may be used to minimize errors in the measurement of force (F). In some embodiments, to achieve an adequate compression ratio for a given incompressible material a proper stiffness (K) may be selected for transformation element 423. For stiffness (K) may scale the compression ratio as illustrated by Equation 1. In embodiments, stiffness (K) may be a function of both the cross-sectional area of the transformation element 423 and the elastic module of the material of transformation element 423. In embodiments, the stiffness may be selected in view of the desired dynamic range of the force sensor unit. For example, for large dynamic ranges (e.g., range of force applied to force sensor unit), a stiffer material and/or larger cross section may be selected, while the opposite may be selected for smaller dynamic ranges. In embodiments, for a given range of compressive force 450, a transformation element 422 or strain transformation structure 433 may be designed to have a substantially linear relationship between compressive force 450 and capacitance.

It may be noted that embodiments herein may also be applied to applications that use a non-linear response of elements and features described herein. For example, in applications where a linear response is not used, a force sensor unit and other embodiments described herein may be used. In embodiments, a force sensor unit may be used in high-strain applications (e.g., large range of compression ratios), such as between —the strut and frame of a car. In high-strain applications, a nonlinear calibration may be performed to generate accurate force measurement.

Figure 30:
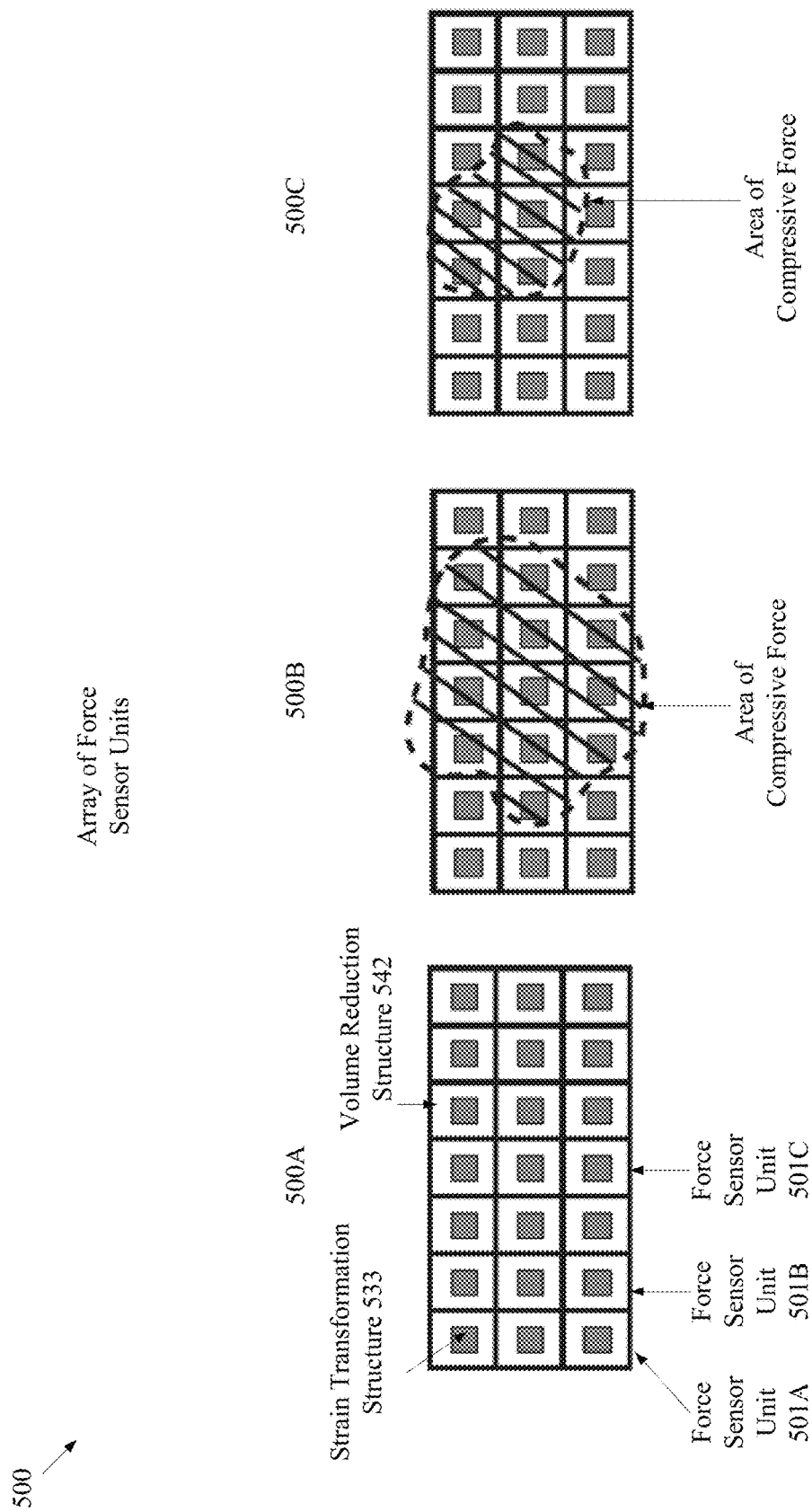
FIG. 30 is an illustration of an array of force sensor units, in accordance with some embodiments.

FIG. 30 is an illustration of an array of force sensor units 500, in accordance with some embodiments. In embodiments, an array of force sensor units 500 may include two or more force sensor units 501 arranged in any physical pattern. For purposes of illustration, rather than limitation, the array of force sensor units 500 includes 21 force sensor units 501. The force sensor units 501 have a strain transformation structure 533 surrounded on the sides by volume reduction structure 542. In embodiments, the force sensor units 501 of the array of force sensor units 500 may each have a separate sense element, such as a compliant capacitor. In other embodiments, one or more force sensor units 501 of the array of force sensor units 500 may share a sense element.

In embodiments, the force sensor units 501 of the array of force sensor units 500 may be coupled in parallel. In embodiments, force sensor units 501 may be coupled in parallel in a variety of ways. For example, force sensor units 501 may be physically wired to electrically couple in parallel. In another example, a multiplexer or other switch may be used to couple the force sensor units 501 in parallel. The multiplexer may also switch the coupling of force sensor units 501 to other configurations, in embodiments. In still another example, the one or more force sensor units 501 may be measured independently and later added together, by a processing device, for example.

In embodiments, array of force sensor units 500A shows the array under no to negligible compressive force. Array of force sensor units 500B and 500C shows a constant and same compressive force applied to each of the arrays but with different contact areas (e.g., area covered by dashed circular shape). In embodiments, an absolute force may be determined by the array of force sensor units 500. For example, the substantially linear response of the array of force sensor units 500 may induce a change in capacitance that is the same in array of force sensor units 500B and 500C. The array of force sensor units 500 may be an absolute force sensor invariant to the pressure profile. It may be noted that the aforementioned pressure profile may relate to the linear supposition principle, where adding a linear response of a linear force measurement unit, such as a force sensor unit 500, provides a total force irrespective of the force profile. It may be noted that the size and density of the strain transformation structure 533 may be selected to support the range of compressive forces being sensed. In some embodiments, strain transformation structures 533 may be spaced so as to allow expansion under the full range of compressive force and not be obstructed by adjacent force sensor units 501 or adjacent strain transformation structures 533. In embodiments, the stiffness or the shape of the strain transformation structures 533 may be chosen to provide a substantially linear capacitance response to a given range of compressive force or loading conditions.

What is claimed is:

1. An apparatus comprising:
   a strand of compliant material with a center axis oriented along a length of the strand and oriented perpendicular to a width of the strand when the strand is in a linear and non-bent position; and
   angular displacement sensor connected to the strand, the angular displacement sensor comprising:
      a first angular displacement unit disposed in a first sense region of the strand, wherein the first angular displacement unit is offset from the center axis of the strand and extends along a first line offset from a first part of the center axis, wherein the first angular displacement unit comprises a first end defining a first vector and a second end defining a second vector, wherein a first angular displacement between the first vector and the second vector within a first plane extending along the first part of the center axis and orthogonal to a width of the first angular displacement unit is to be determined responsive to deformation of the first angular displacement unit; and
   a reinforcement structure associated with the first angular displacement unit, wherein the reinforcement structure comprises a material that is stiffer than the strand of compliant material and restricts movement of the first angular displacement unit with respect to the center axis.

2. The apparatus of claim 1, wherein the apparatus is configured to sense in multiple regions, the apparatus further comprising:

a second angular displacement unit disposed in a second sense region of the strand, wherein the second angular displacement unit is offset from the center axis of the strand and extends along a second line offset from a second part of the center axis, wherein the second angular displacement unit comprises a third end defining a third vector and a fourth end defining a fourth vector, wherein a second angular displacement between the third vector and the fourth vector within a second plane extending along the second part of the center axis and orthogonal to a width of the second angular displacement unit is to be determined in response to deformation of the second angular displacement unit.

3. The apparatus of claim 1 wherein the reinforcement structure restricts movement along the center axis.

4. The apparatus of claim 1 wherein the reinforcement structure restricts movement perpendicular to the center axis.

5. The apparatus of claim 1 wherein the reinforcement structure further comprises aligned fibers.

6. The apparatus of claim 5 wherein the aligned fibers are adhered to an outer surface of the strand of compliant material.

7. The apparatus of claim 4 wherein the aligned fibers are embedded within the strand of compliant material.

8. A method of manufacturing an angular displacement sensor, the method comprising:
 providing a strand of compliant material with a center axis oriented along a length of the strand and oriented perpendicular to a width of the strand when the strand is in a linear and non-bent position;
 coupling an angular displacement sensor to the strand, the angular displacement sensor comprising:
  a first angular displacement unit disposed in a first sense region of the strand, wherein the first angular displacement unit is offset from the center axis of the strand and extends along a first line offset from a first part of the center axis, wherein the first angular displacement unit comprises a first end defining a first vector and a second end defining a second vector, wherein a first angular displacement between the first vector and the second vector within a first plane extending along the first part of the center axis and orthogonal to a width of the first angular displacement unit is to be determined responsive to deformation of the first angular displacement unit; and
 coupling a reinforcement structure associated to the first angular displacement unit, wherein the reinforcement structure comprises a material that is stiffer than the strand of compliant material and restricts movement of the first angular displacement unit with respect to the center axis.

9. The method of manufacturing an angular displacement sensor of claim 8 wherein the angular displacement sensor is configured to sense in multiple regions, the method further comprising:
 coupling a second angular displacement unit disposed in a second sense region of the strand, wherein the second angular displacement unit is offset from the center axis of the strand and extends along a second line offset from a second part of the center axis, wherein the second angular displacement unit comprises a third end defining a third vector and a fourth end defining a fourth vector, wherein a second angular displacement between the third vector and the fourth vector within a second plane extending along the second part of the center axis and orthogonal to a width of the second angular displacement unit is to be determined in response to deformation of the second angular displacement unit.

10. The method of claim 8 further comprising orienting the reinforcement structure to restrict movement along the center axis.

11. The method of claim 8 further comprising orienting the reinforcement structure to restrict movement perpendicular to the center axis.

12. The method of claim 8 wherein the reinforcement structure further comprises aligned fibers and the method further comprises adhering the aligned fibers to an outer surface of the strand of compliant material.

13. The method of claim 8 wherein the reinforcement structure further comprises aligned fibers and the method further comprises embedding the aligned fibers within the strand of compliant material.

14. A compliant angular displacement sensor comprising:
 a compliant material having a center axis; and
 an angular displacement sensor connected to the compliant material, the angular displacement sensor comprising:
  a first angular displacement unit disposed in a first sense region of the compliant material, wherein the first angular displacement unit comprises a first end defining a first vector and a second end defining a second vector, wherein a first angular displacement between the first vector and the second vector within a first plane is determined to be responsive to deformation of the first angular displacement unit; and
 a reinforcement structure associated with the first angular displacement, wherein the reinforcement structure comprises a material that is stiffer than the compliant material and restricts movement of the first angular displacement unit with respect to the center axis.

15. The compliant angular displacement sensor of claim 14, wherein the compliant angular displacement sensor is configured to sense in multiple regions, the complaint angular displacement sensor further comprising:
 a second angular displacement unit disposed in a second sense region of the compliant material, wherein the second angular displacement unit comprises a third end defining a third vector and a fourth end defining a fourth vector, wherein a second angular displacement between the third vector and the fourth vector within a second plane is determined to be responsive to deformation of the second angular displacement unit.

16. The compliant angular displacement sensor of claim 14 wherein the reinforcement structure restricts movement along the center axis.

17. The compliant angular displacement sensor of claim 14 wherein the reinforcement structure restricts movement perpendicular to the center axis.

18. The compliant angular displacement sensor of claim 14 wherein the compliant material has a top surface and a bottom surface and the reinforcement structure further comprises:
 a top reinforcement structure located on the top surface of the compliant material; and
 a bottom reinforcement structure located on the bottom surface of the compliant material.

19. The compliant angular displacement sensor of claim 14 wherein the compliant material has an outer perimeter and the reinforcement structure substantially encloses the outer perimeter of the compliant material.

20. The compliant angular displacement sensor of claim 14 wherein the compliant material has an inner portion and the reinforcement structure is located in the inner portion of the compliant material.

* * * * *